United States Patent [19]
Suzuki et al.

[11] Patent Number: 5,956,650
[45] Date of Patent: Sep. 21, 1999

[54] COMMUNICATION SYSTEM INTERCONNECTING TELEPHONE LINE AND SINGLE-FREQUENCY SIMULTANEOUS TRANSMISSION/RECEPTION RADIO SYSTEM

[75] Inventors: Osamu Suzuki, Sayama; Mitsuo Shiraishi, Musashino; Sakari Ohira, Sendai, all of Japan

[73] Assignees: Hitachi Denshi Kabushiki Kaisha, Tokyo; Tohoku Electric Power Co., Inc., Miyagi-ken, both of Japan

[21] Appl. No.: 08/501,179

[22] Filed: Jul. 11, 1995

[30] Foreign Application Priority Data

Jul. 11, 1994 [JP] Japan .................................. 6-158785

[51] Int. Cl.$^6$ .................................................. H04Q 7/20
[52] U.S. Cl. ........................ 455/550; 455/554; 455/555; 455/563
[58] Field of Search ................................ 379/57, 58, 59, 379/60, 63; 455/33.1, 54.1, 550, 554, 555, 563, 403, 552, 450, 402; 340/825.5, 824.4; 370/95.3, 109, 95.1

[56] References Cited

U.S. PATENT DOCUMENTS 5,121,391  6/1992  Paneth et al. .............................. 379/59
5,159,596  10/1992  Itoh ....................................... 455/33.1
5,553,079  9/1996  Niki et al. ............................... 370/109
5,557,606  9/1996  Moon et al. ............................. 379/58

*Primary Examiner*—Dwayne Bost
*Assistant Examiner*—Keith Ferguson
*Attorney, Agent, or Firm*—Antonelli, Terry, Stout, & Kraus, LLP

[57] ABSTRACT

A communication system for performing bidirectional communications substantially simultaneously between a telephone line and a radio communication system by using a single-frequency carrier. A base station includes a first radio transceiver and a line connector disposed between the first radio transceiver and the telephone line. A terminal station includes a second radio transceiver. Each of the first and second radio transceivers has a control unit, a transmitter unit including a signal compressor, a synchronizing signal generator and a modulator, and a receiver unit including a signal expander. The control unit sets the line connector to an interconnecting state in response to a connection request signal from the telephone line or the terminal station, while establishes a communication enabling state between the telephone line and the terminal station during a connection processing period. After the communication enabling state has been set up, a speech enabling state is established between the telephone line and the terminal station. The connection processing period is changed over to a speech period after the communication enable state has been established, to thereby allow communication between the telephone line and the terminal station.

22 Claims, 11 Drawing Sheets

COMMUNICATION SYSTEM INTERCONNECTING TELEPHONE LINE AND SINGLE-FREQUENCY SIMULTANEOUS TRANSMISSION/RECEPTION RADIO SYSTEM

CROSS-REFERENCE TO RELATED APPLICATION

The present application relates to the subject matter described in co-pending U.S. patent application Ser. No. 08/330,676 filed on Oct. 28, 1994 by Kenichi Suzuki, et al.

BACKGROUND OF THE INVENTION

The present invention generally relates to a single-frequency simultaneous transmission/reception type radio communication system which allows transmission and reception of speech signals to be performed substantially simultaneously by using a carrier of a single frequency. More particularly, the present invention is concerned with a radio telephone communication system capable of conducting concurrent transmission/reception communication between a telephone set and a radio telephone or transceiver (hereinafter referred to representatively as the radio transceiver) by interconnecting a communication system of the single-frequency simultaneous transmission/reception type and a telephone line.

Mobile radio communication systems which make it possible to conduct speech communications by using, for example, radio transceivers or the like in the open air tend to be increasingly and widely used for practical purposes, which is naturally accompanied with an increasing demand for the facility capable of connecting the radio transceivers with a telephone line.

In this conjunction, it is however noted that in the mobile radio communication systems in which the radio transceivers or the like are used, there is generally adopted an alternate communication system based on a press-to-talk scheme (transmission/reception alternate switching communication scheme).

Parenthetically, in the communication effected by using the press-to-talk type transceivers known heretofore, a simplex communication mode in which a single carrier frequency is used is generally adopted. In the simplex mode communication, an addressee or destination radio transceiver is necessarily set to the receiving state when a counterpart radio transceiver is in a sending mode with the intent to avoid the radio inference. In other words, it was impossible to allow speech communication to be conducted by simultaneously (or concurrently) sending speech information from both the radio transceivers. That is, the speech communication is carried out in an alternate manner such that a counterpart radio transceiver is forced to wait for the end of speech communication from the addressee transceiver in order for the counterapart radio transceiver to send speech information. Thus, it is safe to say that this system is very inconvenient as a communication facility. On the other hand, in the telephone communication system such as public telephone communication systems, a so-called duplex communication system is adopted which allows both subscribers to exchange speeches substantially simultaneously independent of each other. This type communication may be referred to as the bidirectional concurrent speech communication. In this conjunction, it is noted that an attempt for realizing a bidirectional communication between the radio transceiver and the telephone set by interconnecting the simplex-mode transceiver and the duplex-mode telephone line will necessarily have to be based on the simplex communication mode. In the bidirectional transceiver communication system known heretofore, use of two carriers of mutually different frequencies is indispensable, which is not preferable from the standpoint of radio wave utilization efficiency.

In recent years, a single-frequency simultaneous transmission/reception type communication system which enables bidirectional communication by using a same carrier frequency for both reception and transmission has been developed and is actually used for practical applications. With the single-frequency simultaneous transmission/reception type communication system, speech can be transferred without the need for an intervening of switching (or change-over) operation as required in the press-to-talk system regardless of the use of a single carrier frequency.

Parenthetically, a radio communication system in which transmission and reception can be performed substantially on a real-time basis by using a single frequency is disclosed in the specification of PCT Application WO 91/02414 published on Feb. 21, 1991.

Furthermore, a radio transceiver of the single-frequency simultaneous transmission/reception type which is destined for installation on a motor vehicle or automobile (hereinafter referred to simply as the car) is proposed in an article entitled "SIMULTANEOUS TRANSMITTING AND RECEIVING METHOD MOBILE RADIO USING A SINGLE FREQUENCY": Proceedings of 1992 IEICE Spring Conference, Paper No. B-769, (Mar. 15, 1992), pp. 3–336.

For a better understanding of the background techniques of the present invention, an example of the single-frequency simultaneous reception/transmission type communication system will be explained by reference to FIG. 8 of the accompanying drawings. Referring to the figure, voice signals a inputted successively undergo temporal compression (time-base compression) at every interval t to be thereby converted to a modulated signal b, wherein empty or available time accrued in the interval or period t owing to the compression processing mentioned above can be allocated to the reception. More specifically, during the reception interval thus made available, the signals incoming from the counterpart or addressee apparatus and undergone the temporal compression in the same manner as mentioned above can be received. The continuous reception voice or speech output can be obtained by decompressing or expanding twice as long as the received voice signal. Change-over of the transmission/reception operations is controlled by using a transmission/reception switching control signal c having a predetermined duration of e.g. 400 milliseconds, to thereby repeat alternately transmission or sending operation and receiving operation each of e.g. 200 milliseconds on a time division basis. In this way, the simultaneous single-frequency bidirectional communications can be carried out.

In this connection, the timing for the temporal compression/expansion is controlled or managed by making use of a synchronizing signal sent out at every transmission interval, as shown at (b) in FIG. 8.

More specifically, the station (radio transceiver) which started the transmission takes the initiative in sending out the modulated signal (b). On the other hand, the station having received the modulated signal (b) detects the synchronizing signal contained in the modulated signal (b) to thereby control the switching between the transmission and the reception. Subsequently, the transmission and the reception are alternately changed over repetitively by transferring the synchronizing signal. The control to this end is generally performed with the aid of a microcomputer.

In the radio transceiver system of the single-frequency simultaneous transmission/reception type described above, no consideration is paid to the facility for connecting the radio transceiver to the telephone line. Consequently, it is impossible to connect the radio transceiver to the telephone line for allowing communication between the radio transceiver and a telephone set, because the latter cannot directly send out any radio waves to the radio transceiver.

Such being the circumstances, it is required to equip a telephone set with a radio transceiver in order to make it possible to conduct speech communication between the telephone set and other radio transceiver.

In the radio transceiver system of the single-frequency simultaneous transmission/reception type, a voice signal generated through a microphone is divided into signal segments, each of a predetermined minute period of e.g. 400 msec., whereon the signals resulting from the division undergo temporal or time-base compression and a carrier is then modulated with the compressed signal to be subsequently sent out. The counterpart or addressee radio transceiver expands the compressed signal as received to the original length for reproduction of the voice signal. On the other hand, when communication is to be started from a terminal station, a connection procedure must be taken for calling the counterpart or addressee by sending a dial signal corresponding to the identification (ID) number of the counterpart or addressee. For generating the dial signal, there is usually adopted a DTMF (Dural-Tone Multifrequency) signaling or dial-pulse signaling scheme. In this conjunction, it should be mentioned that when the dial signal of relatively low transfer rate is transmitted from the radio transceiver of the single-frequency simultaneous transmission/reception type, the dial signal is likely to be divided with a certain rate, which undesirably involves error in the dial signal as received, leading to occurrence of erroneous connection.

The problem mentioned above can certainly be coped with by modulating the dial signal with a MSK (Minimum Shift Keying) signal which can ensure a high transfer rate on the order of 2,400 bps. In that case, the dial signal can be transmitted during the minute period resulting from the division mentioned previously without substantially incurring any possibility of the MSK dial signal being fragmented. However, when the MSK dial signal is to be transmitted by using the radio transceiver of the single-frequency simultaneous transmission/reception type, the MSK dial signal equally undergoes the temporal compression by a factor of ½, as mentioned previously. This means that the compressed dial signal has a frequency which is about twice as high as that of the original dial signal. By way of example, the original MSK dial signal of 2,400 Hz will have a frequency of 4,800 Hz or more after the temporal or time-base compression.

By contrast, the frequency band of a radio transmission channel is usually about 3 kHz. For this reason, in the case of the single-frequency simultaneous transmission/reception communication system in which the signal is temporally compressed by a factor of ½, the frequency band of the original signal is decreased by about one half (1.5 kHz). Consequently, the aforementioned MSK modulated signal, i.e., the dial signal cannot be used intact. Thus, realization of the bidirectional concurrent speech communication between a telephone set and radio transceiver of the single-frequency simultaneous transmission/reception type encounters a great difficulty or obstacles which cannot be coped with by using the techniques known heretofore.

SUMMARY OF THE INVENTION

In the light of the state of the art described above, it is an object of the present invention to provide a radio telephone communication system which is capable of connecting a radio transceiver of a single-frequency simultaneous transmission/reception type to a telephone line for allowing bidirectional concurrent speech communications to be performed instantaneously between a telephone set and the radio transceiver.

In order to interconnect a radio communication system of the single-frequency simultaneous transmission/reception type and a telephone line, one of plural radio transceivers belonging to a radio communication system is selected as a base station, which is provided with a line connector for connecting the radio transceiver and the telephone line to each other. The radio transceivers other than the one selected as the base station are to serve as terminal stations. The radio transceivers of the terminal stations and that of the base station are interconnected via radio communication channels. Thus, the radio transceivers of the terminal stations are connected to the telephone line via the base station, whereby speech communication can be performed between the radio transceiver and the terminal station in accordance with the single-frequency simultaneous transmission/reception scheme.

In view of the above and other objects which will become apparent as the description proceeds, there is provided according to a general aspect of the present invention a communication system for performing bidirectional communications substantially simultaneously between a telephone line and a radio communication system by using a single-frequency carrier. A base station includes a first radio transceiver and a line connector disposed between the first radio transceiver and the telephone line. A terminal station includes a second radio transceiver. Each of the first and second radio transceivers is comprised of a control unit, a transmitter unit including a signal compressor, a synchronizing signal generator and a modulator, and a receiver unit including a signal expander. The control unit sets the line connector to an interconnecting state in response to a connection request signal from the telephone line or the terminal station, while establishing a communication enabling state between the telephone line and the terminal station during a connection processing period. After the communication enabling state has been set up, the connection processing period is changed over to a speech communication period, for thereby allowing communication between the telephone line and the terminal station.

The transmitter unit modulates the speech request signal and sends out the modulated speech request signal while bypassing the signal compressor during the connection processing period. During the speech period, the control unit selects a transmission interval and a reception interval alternately with each other so that the transmitter unit and the receiver unit can operate alternately at a predetermined periodic interval after occurrence of the connection signal. At the same time, the signal compressor divides an input voice signal periodically at a predetermined time interval, compresses the voice signals resulting from the division, and adds the compressed voice signal to a synchronizing signal generated by the synchronizing signal generator. The compressed voice signal and the synchronizing signal are then sent out from the transmitter unit during the transmission interval.

In a preferred mode for carrying out the invention, the speech request signal containing, e.g. MSK modulated dial signal is sent out without being compressed during the line connection processing, while during the speech communication period succeeding to the line connection, the concurrent transmission/reception communication is performed with the signals involved in the communication being compressed.

Because the signals are transmitted without undergoing the compression during a period required for making connection with the telephone line, the dial signal and others can be transmitted with high fidelity while allowing the connection with the telephone line in a much facilitated manner.

On the other hand, after the connection with the telephone line has been established, the signal transfer is performed in accordance with the single-frequency simultaneous transmission/reception scheme. Thus, the bidirectional concurrent speech communication can be realized between the telephone set and the radio transceiver without need for any more than a single carrier frequency.

The above and other objects, features and attendant advantages of the present invention will be better understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention which is directed to a wireless or radio telephone communication system will be described in detail in conjunction with what is presently considered preferred or typical embodiments thereof by reference to the accompanying drawings, being understood however that the invention is never restricted exactly to the structures and operations disclosed herein but susceptible to numerous modifications without departing from the spirit and scope of the invention. Also in the following description, it is to be understood that terms used herein are words of convenience and are not to be construed as limiting terms.

Embodiment 1

Figure 7:
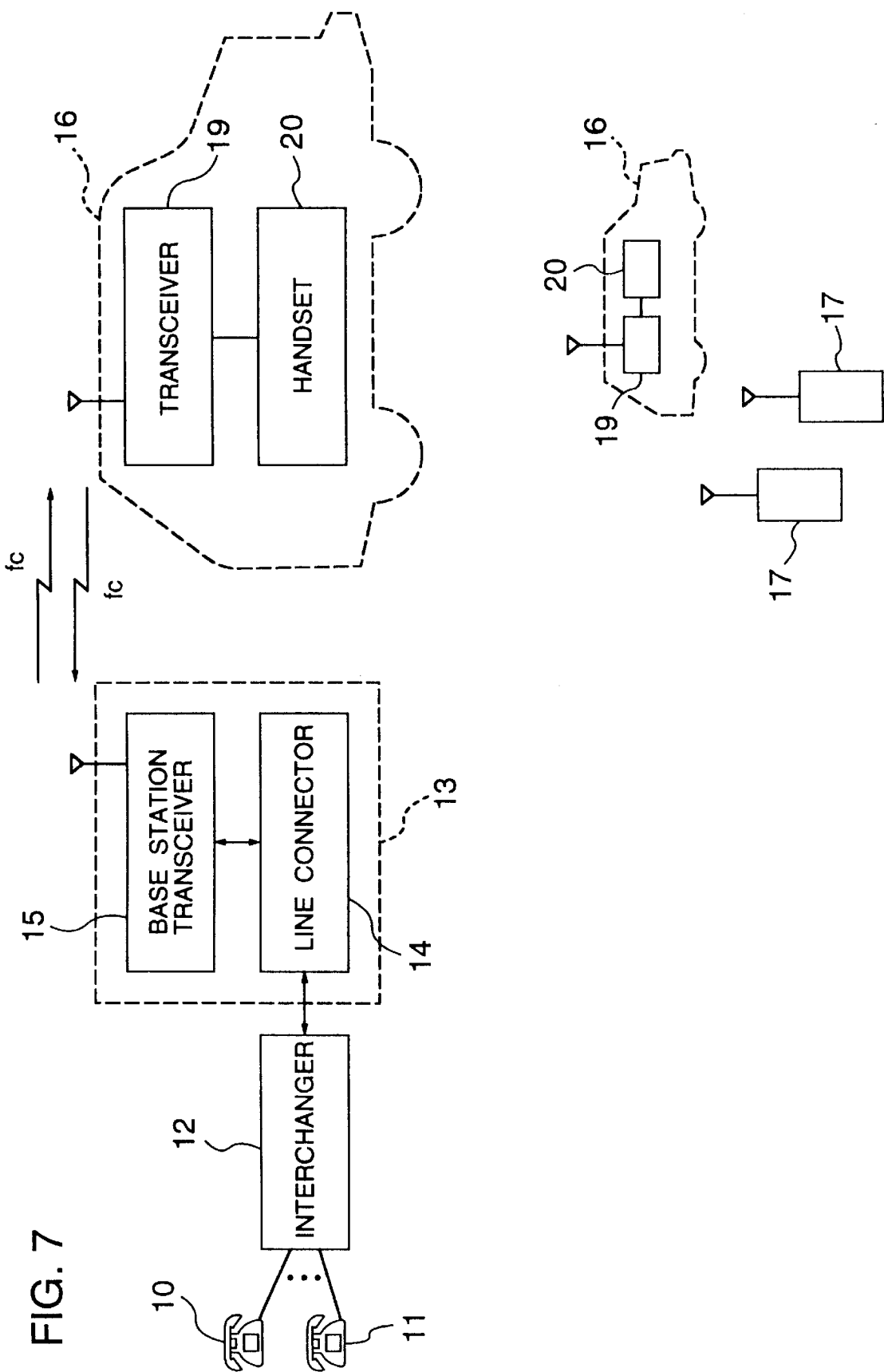
FIG. 7 is a view showing a radio telephone system to which the concept of the present invention can be applied.

At first, referring to FIG. 7, there is shown only schematically a general configuration of a radio telephone system according to a first embodiment of the invention. In the figure, reference numerals 10 and 11 denote telephone sets, respectively, 12 denotes an interchanger (which may also be referred to as the exchange, switch or switching board), wherein the telephone sets 10 and 11 are connected to respective subscriber's circuits of the interchanger 12. At this juncture, it should be mentioned that although only two telephone sets are shown as provided in the system shown in FIG. 1, this is only for convenience the of the present description. In actuality, the number of the telephone sets may be more than three.

Further, in FIG. 7, reference numeral 13 denotes a base station, 14 denotes a line connector, and a numeral 15 denotes a base station radio transceiver which is implemented as a single-frequency simultaneous transmission/reception type transceiver, wherein the line connector 14 serves to interconnect the base station radio transceiver 15 with the interchanger or switching system 12.

Parenthetically, it should be added that the number of the base station is not limited to one. In practical applications, the radio telephone system according to the invention may include two or more base stations.

Furthermore, in FIG. 7, reference numerals 16 denote mobile stations or terminals, each of which is installed in an automobile or car (hereinafter, this mobile station will be also referred to as the car-onboard mobile station and which is constituted by the single-frequency simultaneous transmission/reception type transceiver. Additionally, reference numerals 17 denote portable (or pocket) mobile terminals (also referred to as the portable terminal station), respectively, each of which is equally constituted by a single-frequency simultaneous transmission/reception type radio transceiver. All of these mobile stations and the portable terminal stations are capable of performing telecommunications mutually and with the base station radio transceiver 15 in accordance with the single-frequency simultaneous transmission/reception communication method. The numbers of the mobile terminal or stations 16 and 17, respectively, provided in the radio telephone system may differ from those shown in FIG. 7.

Each of the car-onboard mobile terminals 16 includes a radio transceiver 19 and a handset 20 which is equipped with a key board including a ten-key array and which is connected to the radio transceiver 19. Of course, the handset 20 may be replaced by a combination of a microphone (transmitter), a receiver and a key array implemented in a desired configuration. In the following description, it is however assumed that the handset with a key array is used, by way of example only.

Figure 1:
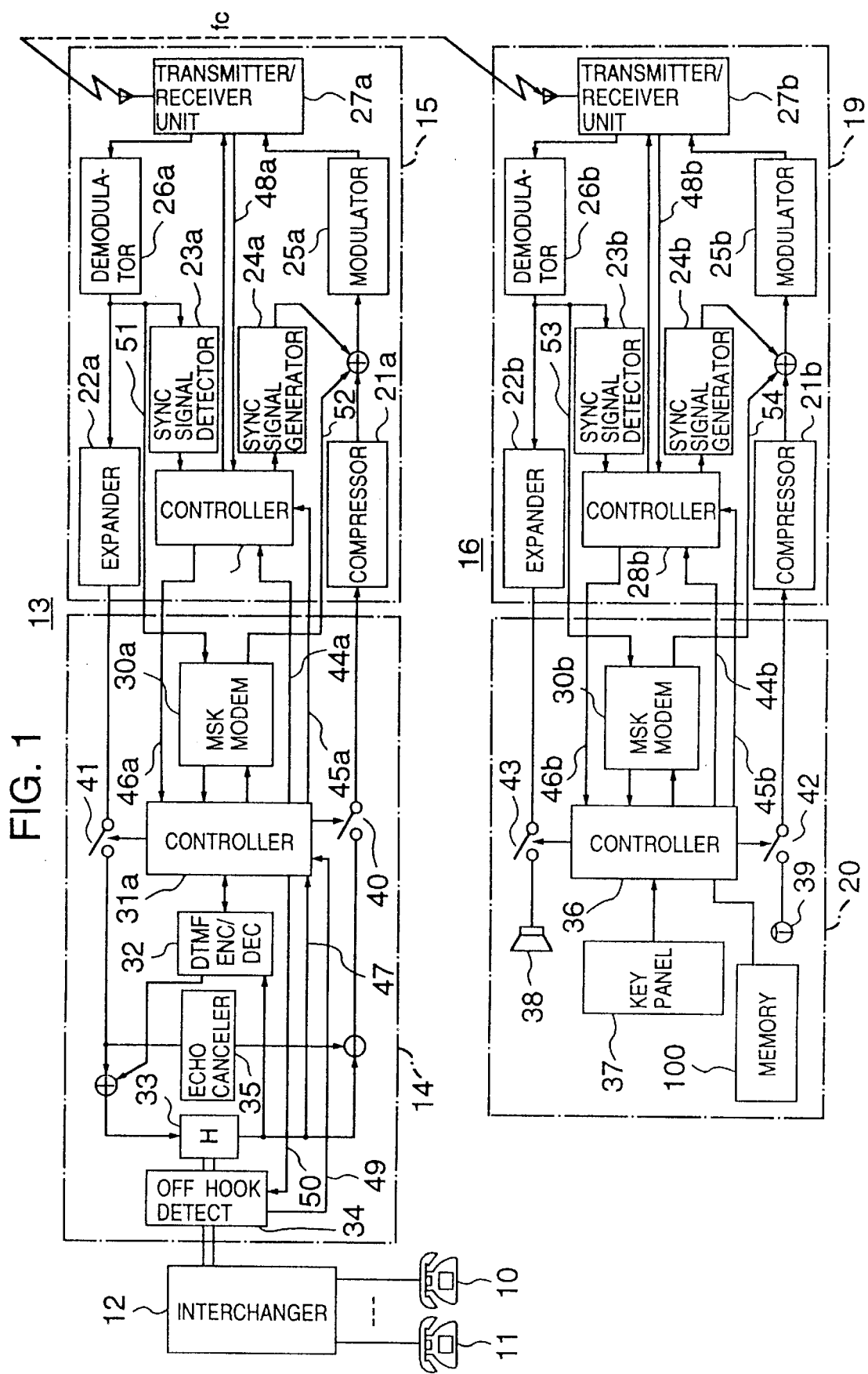
FIG. 1 is a block diagram showing a system configuration of a radio telephone communication system according to a first embodiment of the present invention.

FIG. 1 shows in detail circuit configurations of the base station 13 and the car-onboard mobile terminals 16, respectively. Incidentally, the portable mobile terminals 17 is implemented substantially in the same structure as that of the car-onboard mobile terminals 16 except for some differences which will be pointed out later on. At first, description will be directed to the structure of the base station 13. As can be seen in FIG. 1, the base station radio transceiver 15 is comprised of a speech signal compressor 21a for dividing a sending speech signal (i.e., speech signal to be sent out) at a predetermined time interval and compressing each of the speech signal segments resulting from the division to a time duration corresponding to a half or less of the original duration or length, a received speech signal expander (decompressor) 22a for expanding or decompressing a received speech signal which is compressed in such a manner as mentioned above to the original time duration or length, a synchronizing signal detector 23a for detecting a predetermined synchronizing signal from the received speech signal, a synchronizing signal generator 24a for generating a synchronizing signal, a modulator 25a for modulating the speech signal to be sent out, a demodulator 26a for demodulating the received speech signal, a transmitter/receiver unit 27a and a controller 28a which is in charge of controlling operations of the whole transceiver inclusive of change over operation of the transceiver from a transmission mode to a reception mode and vice versa in synchronism with a timing signal generated internally or the synchronizing signal as received. To this end, the controller may be constituted by a microcomputer.

On the other hand, the line connector 14 is comprised of an MSK (Minimum Shift Keying) modem 30a, a controller 31a constituted by a microcomputer or the like, a DTMF (Dural-Tone Multifrequency) signal encoder/decoder 32, a hybrid transformer 33, an on/off-hook/ring detector 34 for detecting a ring tone signal (ring signal) coming from the interchanger 12 and turning on/off an internal hook switch under the control of the controller 31a, and an echo canceler 35 for preventing generation of an ear-offensive echo which may be generated due to mixing of the speech signal received from a mobile station into the sending speech signal by way of the hybrid transformer 33.

At this juncture, it should be added that when the interchanger or exchanger 12 is implemented in the form of a pulse switch system, a pulse dialer is used in place of the DTMF signal encoder mentioned above.

Next, description will turn to the structure of the car-onboard mobile terminal 16. Concerning the structure of the radio transceiver 19 of the mobile station, it is essentially identical with that of the base station.

On the other hand, the handset 20 of the mobile terminal 16 is comprised of an MSK (Minimum shift Keying) modem 30b, a controller 36, a key panel 37 equipped with a variety of keys inclusive of so-called ten keys "0" to "9" and other keys leveled with marks "*", "#" and the like as in the case of the conventional telephone set and additionally a speech switch, a receiver 38, and a microphone (transmitter) 39.

Although not shown in FIG. 1, the portable mobile terminals 17 are implemented in substantially the same structure as the car-onboard mobile terminals 16. However, in the case of the portable mobile terminals 17, a key panel such as mentioned above is provided integrally with the main body of the portable mobile terminals 17. In other words, the portable mobile terminals 17 are implemented in an integral structure. Accordingly, both the controllers 28b and 36 may be implemented in a unitary structure.

Now, description will turn to operation of the radio telephone system according to the instant embodiment of the invention. At first, line connection procedures will be explained by reference to FIGS. 2 and 3.

Figure 2:
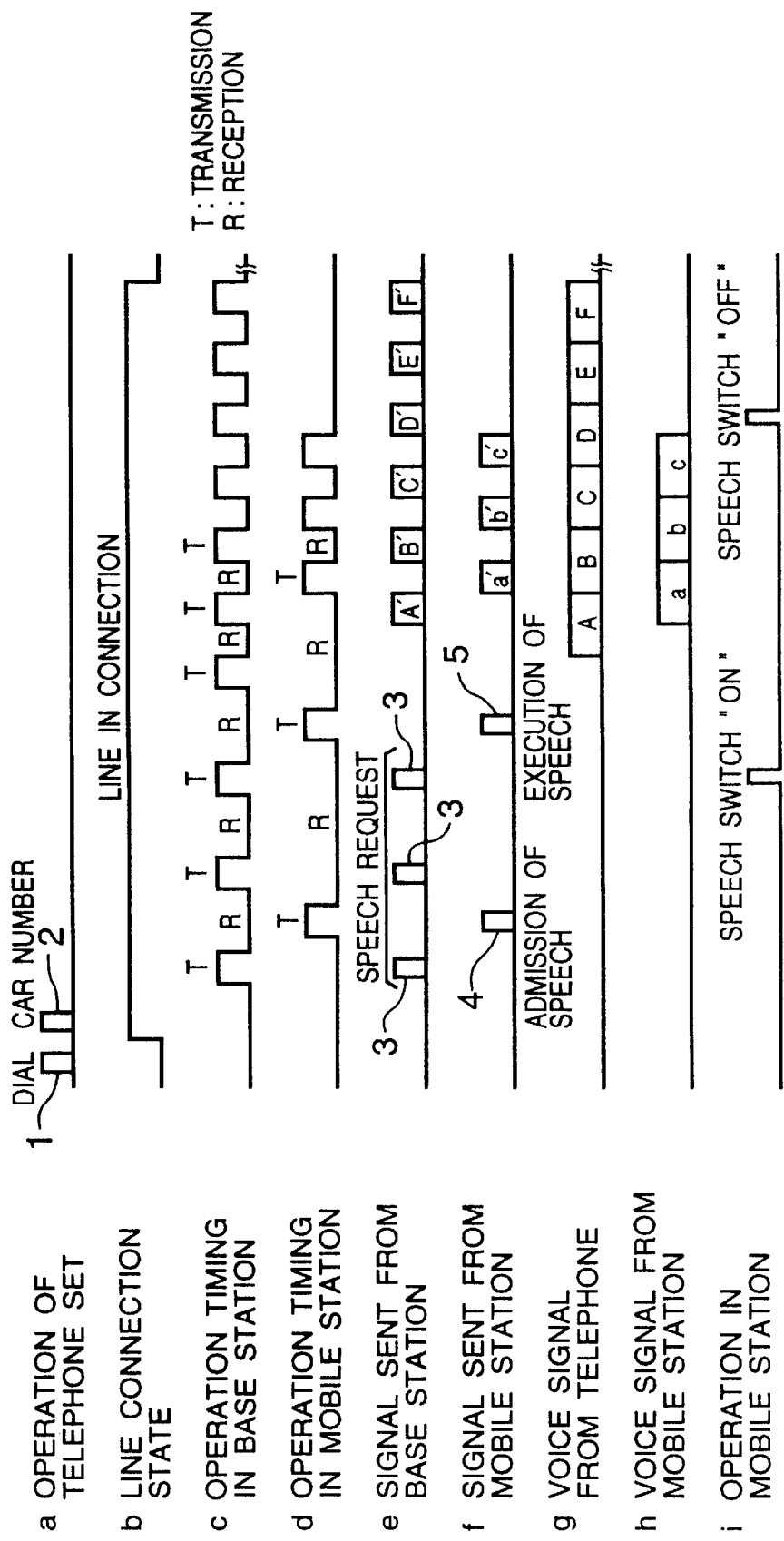
FIG. 2 is a timing chart showing a speech line (channel) connection procedure when a call is issued from a telephone set to a mobile station system in the radio communication system according to the first embodiment of the invention.

FIG. 2 shows a timing chart for a line connection procedure involved when a call is issued from a telephone set to a mobile station.

In FIG. 2, manipulation on the side of the calling party, i.e., the telephone set 10 or 11 is illustrated at (a). In that case, line connection state between the telephone set 10 or 11 and the line connector 14 is shown at (b). Shown at (c) is transmission timing in the base station radio transceiver 15, while the transmission timing in one of the car-onboard mobile terminals 16 and the portable mobile terminals 17 to which the call (access request) is issued is illustrated at (d). Further shown at (e) is a signal sent out from the base station radio transceiver 15, while a signal sent from the mobile station radio transceiver 19 of one of the car-onboard mobile terminals 16 and the portable mobile terminals 17 which is called from the base station is shown at (f). Furthermore, a speech signal from one of the telephone sets 10 and 11 calling one of the mobile stations is shown at (g) with a speech signal sent from one of the car-onboard mobile terminals 16 and the portable mobile terminals 17 which is called by the base station is shown at (h). Finally, operation of the car-onboard mobile terminal 16 or the portable mobile terminal 17 called from the base station is shown at (i).

Now, a procedure for allowing a given one of the telephone sets to call a given one of the mobile stations (the car-onboard mobile terminals 16 and the portable mobile terminals 17) by way of the base station will be described by reference to FIG. 2.

Assuming that a subscriber of either the telephone set 10 or 11 dials a telephone number 1 assigned to the line connector 14, the interchanger 12 responds thereto by sending out the ring tone signal.

When the ring tone signal sent out from the interchanger 12 is detected by the off-hook/ring detector 34 incorporated in the line connector 14, a hook switch provided internally of the line connector 14 is set to the off-hook state, whereby a line or circuit is established between the telephone set and the line connector 14, as shown in FIG. 2 at (b).

Subsequently, the subscriber inputs by using the ten keys (numeral keys) a car number 2 of the mobile station to which the subscriber wishes to make access, as shown at (a) in FIG. 2. The car number mentioned above is an identification number assigned inherently to the mobile station of concern. As a result of this, the DTMF signal carrying the car number data as well is sent out from the telephone set to the line connector 14. In the line connector 14, the DTMF signal is decoded by the DTMF encoder/decoder 32, resulting in that the car number data is supplied to the controller 31. With, the DTMF signal, it is intended to mean a dialing tone signal conventionally adopted in the telephone systems.

In response to the inputting of the car number data, the controller 31 switches on a PTT (Press-To-Talk) switch signal 45a (i.e., transmission activate signal in a simplex mode) to the controller 28a of the base station radio transceiver 15 to thereby set the latter to a simplex sending module. Subsequently, the controller 31 supplies a speech communication request command 3 to the MSK modem 30a. Incidentally, with the phrase, "simplex operation mode" or simply "simplex mode", it is contemplated to mean a mode of communication in which the transmission and the reception are alternately exchanged.

The speech communication request command 3 contains the associated base station number to which the calling subscriber or party belongs and the car number of the mobile station which is to be called. The MSK modem 30a converts the speech communication request command 3 into the corresponding MSK signal, which is then supplied to the modulator 25a of the base station radio transceiver 15. In response, the modulator 25a modulates a carrier of a predetermined frequency fc with the MSK signal resulting from the conversion of the speech communication request command 3. At this juncture, it should however be mentioned that the speech communication request command 3 may also be converted to other signal formats of a high transfer rate other than the MSK signal.

Upon completion of the output operation of the speech communication request command 3, the controller 31 switches off the PTT switch signal 45a to thereby reset the base station radio transceiver 15 to the receiving state (i.e., reception-ready state). This operation is repeated until the speech communication admit command 4 is received, as described hereinafter.

In this manner, the speech communication request command 3 is repeatedly sent out from the base station 13, as is shown at (e) in FIG. 2. Incidentally, the speech communication request command 3 is inputted to the modulator 25a in a straightforward manner, neither undergoing the processing by the speech signal compressor 21a nor being added with the synchronizing signal. Accordingly, the frequency band of the speech communication request command 3 is not expanded upon sending thereof.

On the other hand, upon reception of the speech communication request command 3, the car-onboard mobile terminal 16 restores the demodulated MSK signal to the original data through the MSK modem 30b incorporated in the handset 20. The restored data is then inputted to the controller 36.

The controller 36 checks whether the speech communication request command 3 included in the received data contains the ID number of the base station to which the car-onboard mobile terminal 16 belongs as well as the ID number of the terminal 16 itself by referencing the corresponding ID numbers stored in a memory or storage 100. When coincidence is found as the result of the check or collation, the controller 36 switches on a PTT (Press-To-Talk) switch signal 45b for the controller 28b of the mobile station radio transceiver 19, as a result of which the mobile station radio transceiver 19 is set to the simplex transmission mode.

In succession, the mobile station radio transceiver 19 issues a speech communication admit command 4 to the MSK modem 30b. The speech communication admit command 4 contains the car number of the relevant mobile station and the ID number of the base station to which the mobile station belongs. The MSK modem 30b converts the speech communication admit command 4 to an MSK signal, which is then supplied to the modulator 25b of the mobile station radio transceiver 19. It should be added that the speech communication admit command 4 is inputted intact to the modulator 25b, neither undergoing the processing through the speech signal compressor 21b nor being added with the synchronizing signal. In the modulator 25b, the carrier fc being of the same frequency as the received carrier is modulated with the MSK signal which results from the conversion of the speech communication admit command 4. The modulated signal is then sent out from the transmitter/receiver unit 27b. Thus, the frequency band of the speech communication admit command 4 is not expanded upon sending thereof.

In this way, the speech communication admit command 4 indicating admission of the speech communication is sent out from the car-onboard mobile terminal 16, as shown at (f) in FIG. 2. Upon completion of operation for sending out the speech communication admit command 4, the controller 36 of the car-onboard mobile terminal 16 switches off the PTT switch signal 45b to thereby reset the mobile station radio transceiver 19 to the reception mode, while triggering operation of an incoming call indicator such as a buzzer, a lamp or the like.

Thus, when a call is generated from another mobile station before the speech communication is validated between the car-onboard mobile terminal 16 and the telephone set, there may undesirably arise such possibility that the connection processing is thereby interfered. In order to prevent the interference, the controller 36 of the handset 20 is designed so that the mobile station receiving a communication request command and a signal indicating a car number other than that of the aforementioned mobile station is set to a transmission inhibit state for a predetermined time, e.g. 5 seconds after reception of the communication request command and adapted to perform a necessary control therefor. More specifically, the transmission inhibit control is performed so that upon occurrence of mismatch between the speech communication request command 3 and the data stored in the memory 100, the controller 36 outputs a signal for inhibiting the communication processing to the mobile station radio transceiver 19.

As mentioned previously, the speech communication request command 3 is repetitively sent out at a predetermined interval, e.g. every second, until a speech communication execute command 5 issued from the car-onboard mobile terminal 16 which is being called by the base station 13 is received, as shown at (e) in FIG. 2. In this way, any mobile station other than that being called is set to the transmission inhibited state, thus being rendered incapable of responding.

When operator of the car-onboard mobile terminal 16 turns on the speech switch provided on the key panel 37 of the handset 20 or takes up the receiver, the controller 36 then issues the speech communication execute command 5 through a procedure similar to the sending of the speech communication admit command 4, as shown at (f) in FIG. 2.

When the speech communication execute command 5 issued form the car-onboard mobile terminal 16 is received by the base station 13, the controller 31 of the line connector 14 stops any further sending of the speech communication request command, as shown at (e) in FIG. 2. Subsequently, a duplex switch signal 44a is issued to the controller 28a of the base station radio transceiver 15, whereby the switches 40 and 41 are turned on to set the base station radio transceiver 15 to a duplex operation mode. In this conjunction, the phrase "duplex operation mode" or simply "duplex mode" denotes operation based on the single-frequency simultaneous transmission/reception communication scheme.

Figure 8:
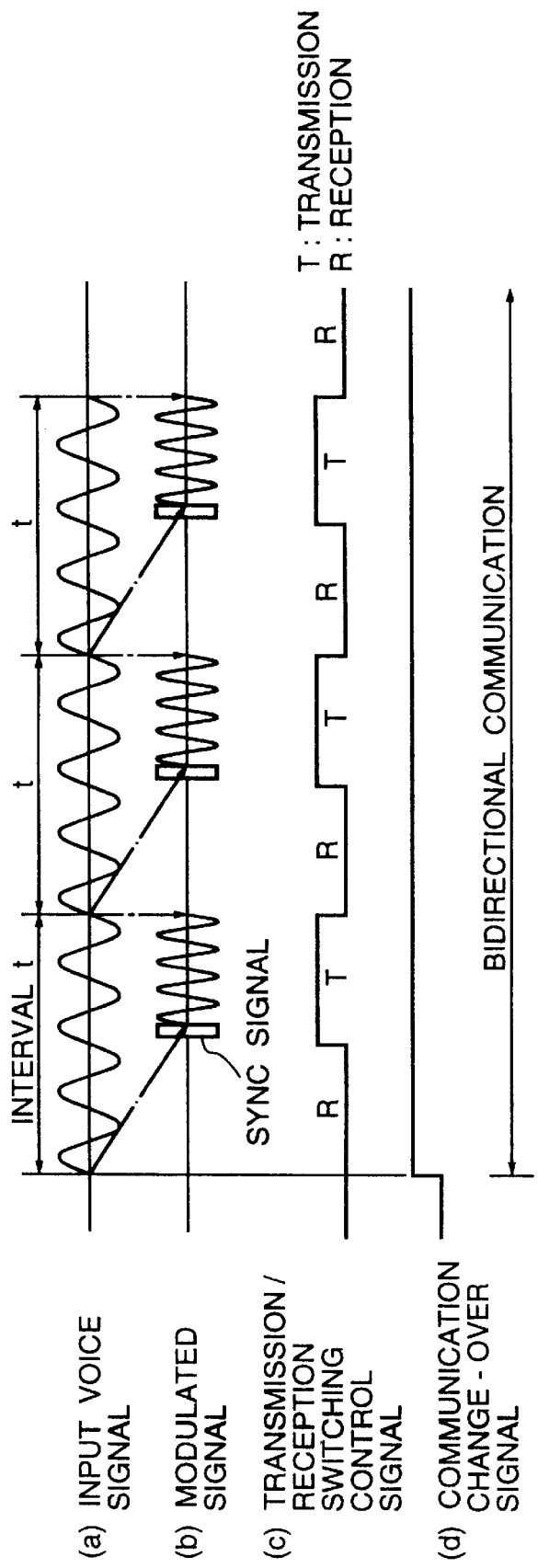
FIG. 8 is a timing chart for illustrating generally operation of a radio transceiver of a single-frequency simultaneous transmission/reception type.
Figure 9:
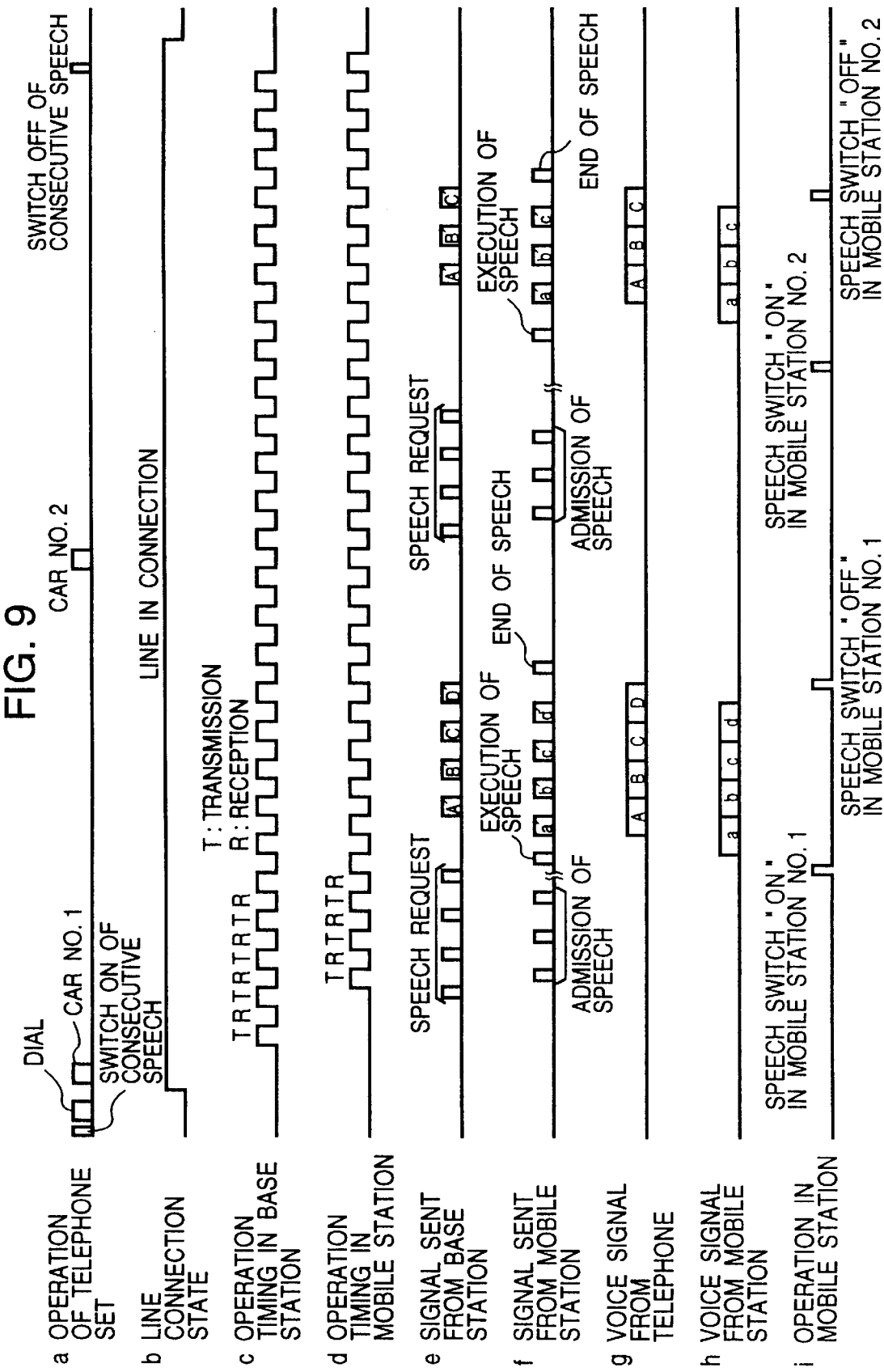
FIG. 9 is a timing chart for illustrating another example of a speech communication establishing procedure executed in response to a call from a telephone set in the system according to the second embodiment of the invention.
Figure 10:
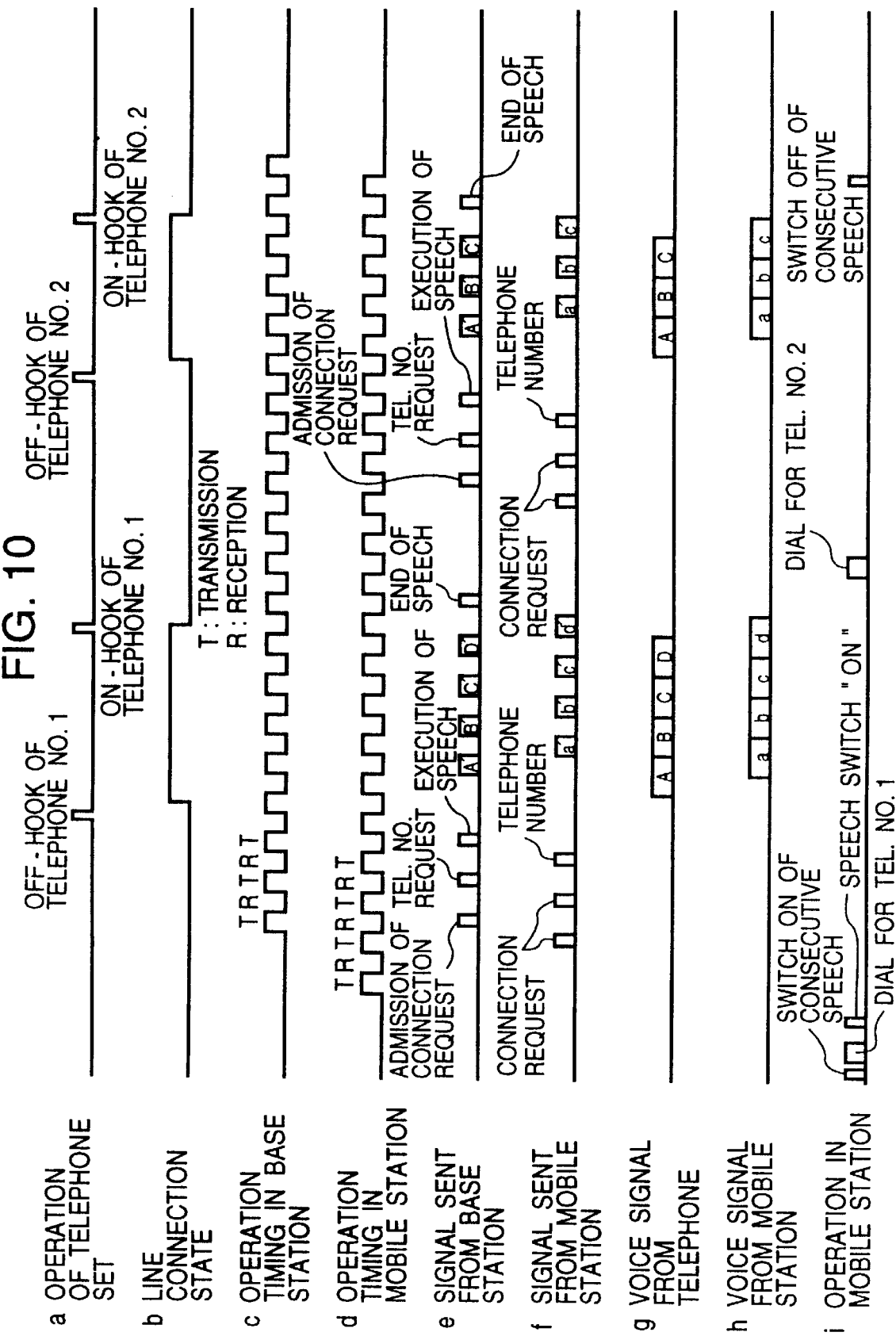
FIG. 10 is a timing chart for illustrating yet another example of speech communication establishing procedure executed in response to a call issued from a mobile station in the system according to the second embodiment of the invention.

Thus, after the instant time point, the base station 13 and the car-onboard mobile terminal 16 enter the duplex mode, i.e., the single-frequency simultaneous transmission/reception communication mode described hereinbefore by reference to FIG. 8, wherein the speech information from the telephone set 10 or 11 is inputted to the speech signal compressor 21a of the base station radio transceiver 15 for allowing the compressed speech information to be sent out from the transmitter/receiver unit 27a. When the car-onboard mobile terminal 16 as called by the base station which is now in the duplex mode enters the duplex mode by detecting the synchronizing signal, the controller 36 of the handset switches on a duplex mode switch signal 44b to thereby allow the single-frequency simultaneous transmission/reception communication to start in synchronism with the base station. The speech signal generated by the microphone 39 is inputted to the speech signal compressor 21b of the mobile station transceiver to be compressed for transmission.

In this manner, the bidirectional concurrent speech communication can be performed between one of the telephone sets 10 and 11 and the mobile station as called in a manner similar to the communication in the conventional telephone system.

During the duplex operation mode, any other mobile stations belonging to the base station under consideration are set to the transmission inhibited state with the output from the associated receiver being disabled under the control of the controller 36.

In this conjunction, it should mentioned that such arrangement may equally be adopted such that contents of communication of the other station can be monitored, as occasion requires, by providing a monitor switch, for example, in the handset.

Next, description is directed to a processing procedure involved for ending the speech communication.

At first, the speech communication ending operation performed by the car-onboard mobile terminal 16 will be considered.

When the speech switch provided in the key panel 37 of the handset 20 of the car-onboard mobile terminal 16 is turned off, the controller 36 switches off the duplex mode switch signal 44b for the controller 28b of the mobile station radio transceiver 19 to thereby set the mobile station radio transceiver 19 in the reception-only mode (i.e., monitor mode). As a result, sending of the carrier from this mobile station is interrupted.

On the other hand, in the base station 13, the controller 28a monitors a carrier signal 48a from the mobile station and switches off a duplex mode signal 46a when the carrier signal 48a has been discontinued for a predetermined time period. As a result, the hook switch of the off-hook/ring detector 34 is set to the on-hook state by the controller 31, whereby the telephone line is disconnected. At the same time, the controller 31 switches off the duplex switch signal 44a for allowing the mobile station radio transceiver 19 to resume the reception-only mode (monitor mode). Thus, the speech communication is ended.

Processing for ending the speech communication at the telephone set is performed in the manner described below.

When one of the telephone sets 10 and 11 through which the speech communication is being performed is set to the on-hook state, a busy tone signal is sent out from the interchanger 12. This busy tone signal is detected by the controller 31 of the line connector 14, whereby the on/off-hook/ring detector 34 is set to the on-hook state with the duplex mode switch signal 44a being switched off.

Consequently, the telephone line is disconnected with the base station radio transceiver 15 being set to the reception-only state (monitor mode).

Of course, instead of detecting the busy tone signal, such arrangement may also be adapted such that a speech ending signal is inputted from the telephone set, for example, by pushing the DTMF key labeled "#" of the telephone set, which signal is then detected by the DTMF encoder/decoder 32 for terminating the speech communication.

On the other hand, in the mobile station radio transceiver 19 of the car-onboard mobile terminal 16, the controller 28b is adapted to monitor the synchronizing signal 48b sent from the base station to thereby switch off a duplex mode signal 46b when the synchronizing signal 48b has been discontinued for a predetermined time period. In that case, the controller 36 turns switches 42 and 43 off, while switching off the duplex mode switch signal 44b. As a result, the mobile station radio transceiver 19 is reset to the reception-only state (monitor mode) with the speech communication being ended.

Figure 3:
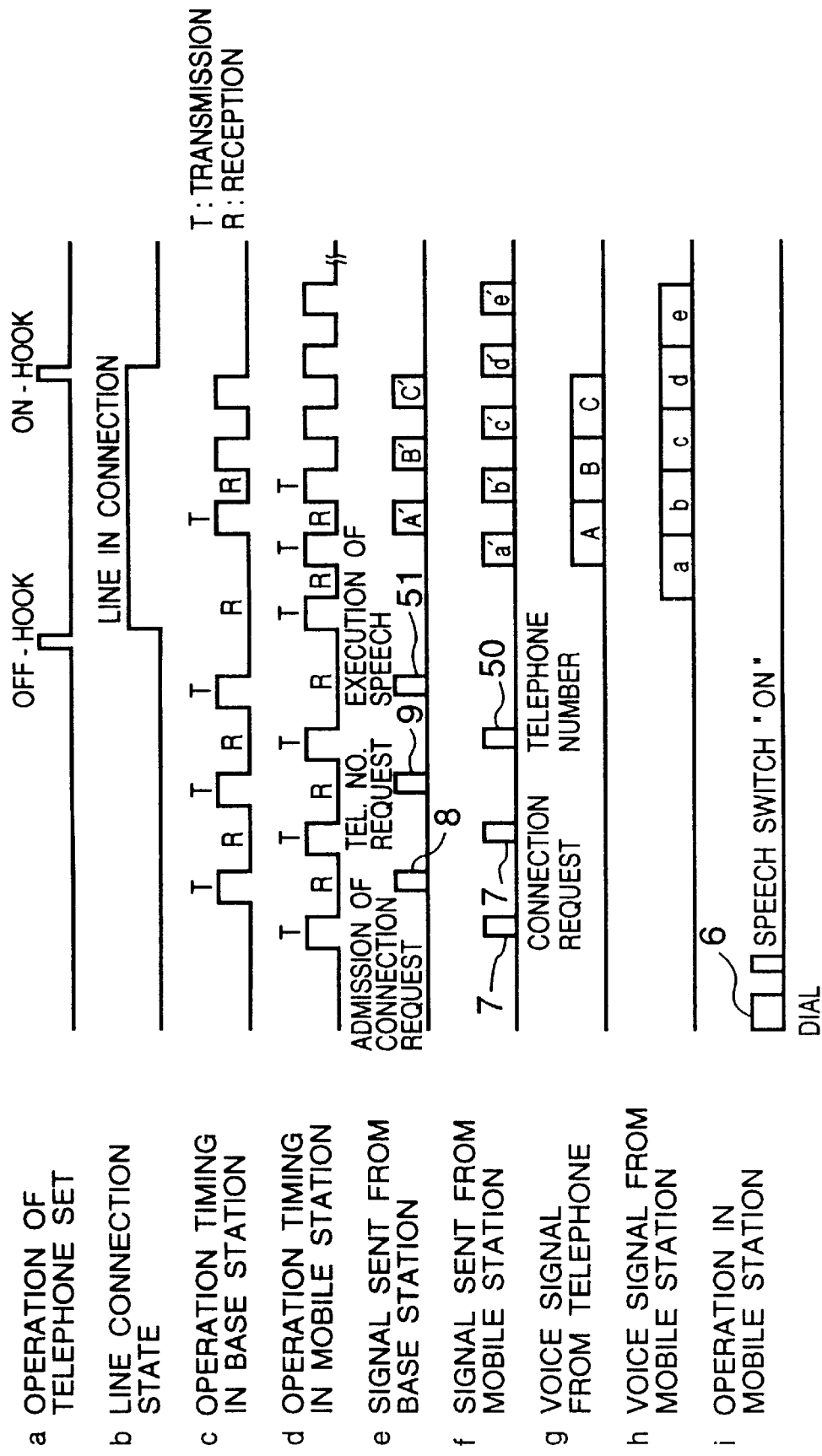
FIG. 3 is a timing chart showing a speech line (channel) connection procedure when a call is issued from a mobile station to a telephone set in the system according to the first embodiment of the invention.

FIG. 3 shows in a timing chart a processing procedure involved when a call is issued from the car-onboard mobile terminal 16 (or the portable mobile terminal 17) to a telephone set.

In FIG. 3, operation of the telephone set 10 or 11 to which a call is issued is illustrated at (a). In that case, line connection state between the telephone set as called and the line connector 14 is shown at (b). Shown at (c) is a transmission timing in the base station radio transceiver 15, while the transmission timing in one of the car-onboard mobile terminals 16 and the portable mobile terminals 17 which has issued the call (access request) is issued is illustrated at (d). Further shown at (e) is a signal sent out from the base station radio transceiver 15 while a signal sent from the mobile station radio transceiver 19 of one of the car-onboard mobile terminals 16 and the portable mobile terminals 17 which has issued a call is shown at (f). Furthermore, a speech signal from one of the telephone sets 10 and 11 called from one of the mobile stations is shown at (g) with a speech signal sent from one of the car-onboard mobile terminals 16 and the portable mobile terminals 17 which has issued the call is shown at (h). Finally, operations of the car-onboard mobile terminals 16 and the portable mobile terminals 17 which has issued the call is shown at (i).

As is shown at (i) in FIG. 3, when a telephone number 6 of a telephone set to be called is dialed through the key panel 37 of the handset 20 of the car-onboard mobile terminal 16 (or the portable mobile terminal 17), whereby the speech communication switch is turned on, the controller 36 incorporated in the handset switches on the PTT switch signal 45b to thereby set the mobile station radio transceiver 19 to the sending mode, which is then followed by issuance of the connection request command 7 to the MSK modem 30b, as shown at (d) in FIG. 3.

In response, the MSK modem 30b converts the connection request command 7 to the MSK signal which is then supplied straightforwardly to the modulator 25b of the mobile station transceiver by bypassing the speech signal compressor 21b. In that case, the synchronizing signal is not added to the connection request command 7. The modulator 25b modulates the carrier fc with the connection request command 7. The signal resulting from the modulation is sent out from the transmitter/receiver unit 27b. At the end of sending of the connection request command 7, the controller 36 switches off the PTT switch signal 45b to thereby reset the mobile station radio transceiver 19 to the reception-only mode. It should be noted that the connection request command 7 contains both the car number of the mobile station and the base station ID number.

Upon reception of the connection request command 7, the base station 13 checks whether the base station ID number is its own ID number and whether the car number of the mobile station is the registered number. If so, the controller 31 switches on the PTT switch signal 45a to set the base station radio transceiver 15 to the sending mode, whereupon a connection request admit command 8 is outputted to the MSK modem 30a. In response, the MSK modem 30a converts the connection request admit command 8 to an MSK (Minimum Shift Keying) signal 52, which is then supplied intact to the modulator 25a of the base station transceiver by bypassing the speech signal compressor 21a, whereby the connection request admit command is sent out, as shown at (e) in FIG. 3. At that time, the synchronizing signal is not added to the connection request admit command 8.

At the end of outputting of the connection request admit command 8, the PTT switch signal 45a is switched off to allow the base station radio transceiver 15 to resume the reception-only mode (monitoring state).

Subsequently, the base station 13 issues a command 9 for requesting a telephone number to be called at a timing shown at (c) in FIG. 3 to the car-onboard mobile terminal 16, as shown at (e) in FIG. 3. To this end, a processing procedure similar to issuance of the connection request admit command 8 mentioned previously is adopted.

In response, the car-onboard mobile terminal 16 sends out a telephone number 50 of concern, as shown at (f) in FIG. 3. This process is similar to the method of sending the connection request command 7 described hereinbefore.

In that case, in order to prevent the other mobile station from issuing a call before the connection between the telephone set being called and the speech communication line has been established, there is adopted such arrangement that any other mobile stations received the connection request admit command or the telephone number request command from the base station are so controlled by the controllers 36 of the individual handsets that they are set to a transmission-inhibited state for a predetermined time, e.g. five seconds after the reception of the command mentioned above. Such communication inhibit control may be realized in accordance with a method similar to that described hereinbefore in conjunction with the processing of the call issued from the telephone set to the mobile station.

Upon reception of the telephone number from the mobile station, the controller 31 incorporated in the line connector 14 of the base station sets the hook switch provided internally of the off-hook/ring detector 34 to the off-hook state to thereby make a telephone circuit or line between the interchanger 12 and the line connector 14 and sends out the telephone number in the form of the DTMF signal from the DTMF encoder/decoder 32 to the interchanger 12. When the interchanger 12 is of a pulse switch type, the telephone number is sent out in the form of a dial pulse signal instead of the DTMF signal.

Now, the interchanger 12 starts to execute a line connection processing on the basis of the telephone number mentioned above for calling the telephone set of concern.

At the same time, the controller 31 sends out a speech communication execute signal 51 to the MSK modem 30a. In response, the MSK modem 30a converts the speech communication execute signal 51 to the MSK signal 52, which signal is then supplied straightforwardly to the modulator 25a of the base station radio transceiver, bypassing the speech signal compressor 21a. Thus, the speech communication execute signal 51 is sent to the car-onboard mobile terminal 16, as shown at (e) in FIG. 3. The speech communication execute signal 51 is transmitted in the same manner as mentioned previously in conjunction with the connection request admit command 8.

When the car-onboard mobile terminal 16 receives the speech communication execute signal 51, the controller 36 of the handset 20 switches on the duplex mode switch signal 44b, as a result of which the mobile station radio transceiver 19 resumes the duplex operation mode with the switches 42 and 43 being turned on for validating the duplex mode.

Subsequently, the base station 13 and the car-onboard mobile terminal 16 operate in accordance with the single-frequency simultaneous transmission/reception communication method, i.e., in the duplex mode, wherein the speech inputted through the microphone 39 of the mobile station is supplied to the speech signal compressor 21b of the mobile station radio transceiver to be sent out in the compressed state.

In response to the speech sent out from the car-onboard mobile terminal 16 in the duplex mode, the base station 13 detects the synchronizing signal, whereby the base station 13 is set to the duplex mode. Then, the controller 31 of the line connector 14 switches on the duplex mode switch signal 44a to start the simultaneous speech transmission/reception communication in synchronism with the mobile station. The speech signal from the telephone set is inputted to the speech signal compressor 21a of the base station radio transceiver 15 to be thereby compressed for transmission.

In this way, until the telephone set called from the interchanger 12 is set to the off-hook state, the operator in the mobile station can hear the ring back tone generated by the interchanger 12 in response to the calling signal through the associated telephone set.

When the telephone set called from the interchanger 12 is set to the off-hook state, a subscriber's circuit loop is formed. Thereafter, speech communication can be performed between the mobile station and the telephone set.

The speech communication is ended through a processing procedure, which will be elucidated below.

At first, it is assumed that the speech communication is to be ended or terminated on the side of the telephone set. When the telephone set is set to the on-hook state, the interchanger 12 outputs the busy tone signal. Of course, the speech communication may be put to an end by inputting the speech end key number signal (e.g. by pushing the key labeled "#") in the form of the DTMF signal, as mentioned hereinbefore.

When the busy-tone signal (or the speech end key number signal) is detected by the controller 31 of the line connector 14, the controller 31 sets the hook switch of the off-hook/ring detector 34 to the on-hook state while switching off the duplex mode switch signal 44a concurrently. As a result, the telephone circuit loop between the interchanger 12 and the line connector 14 is disconnected, whereby the base station radio transceiver 15 resumes the reception-only state in the duplex mode from the simultaneous transmission/reception duplex mode communication state. In other words, because the mobile station sends out the synchronizing signal, the duplex mode is automatically set up.

On the other hand, when a carrier signal 48 from the base station has been discontinued for a predetermined time period in the car-onboard mobile terminal 16, the simplex mode reception state is restored from the duplex mode. Thus, upon lapse of the predetermined period mentioned above, the speech communication comes to an end.

The speech ending procedure executed in the mobile station is as follows.

By turning off the speech communication switch provided in the key panel 37 of the handset 20 or alternatively the receiver is hooked in the mobile station, the controller 36 turns off the duplex mode switch signal 44. In response thereto, the controller 28b sets the operation mode of the mobile station radio transceiver 19 to the simplex mode reception-only state.

On the other hand, when the synchronizing signal from the mobile station has been discontinued for a predetermined period, as mentioned previously, the controller 28a switches off the duplex mode signal 46a while resetting the base station radio transceiver 15 to the simplex mode reception-only state.

Thus, the hook switch of the off-hook/ring detector 34 is set to the off-hook state by the controller 31 of the line connector 14. Consequently, the telephone circuit between the interchanger 12 and the line connector 14 is disconnected, ending the communication.

As is apparent from the foregoing, according to the teachings of the invention incarnated in the first embodiment thereof, the bidirectional concurrent speech communication can be conducted between a given one of the telephone sets and the transceiver of the single-frequency simultaneous transmission/reception type by simply connecting the latter to the telephone line.

Embodiment 2

Next, referring to FIG. 4, description will be made of a bidirectional concurrent speech communication system according to a second embodiment of the present invention.

In the case of the system according to the first embodiment of the invention shown in FIG. 1, the signal transfer procedure performed until the connection has been made between the mobile station and the base station is executed in the simplex mode such that upon ending of the signal sending operation of one of the mobile station, base station other starts the sending operation.

In that case, so long as a given one of the mobile stations and the base station are involved in the simplex mode connection processing, any other mobile station has to be inhibited from the sending operation. For this reason, in the system according to the first embodiment of the invention, such an arrangement is adopted that when a speech communication request or connection request is issued from the base station or a mobile station, the mobile stations other than the one that issued a call are inhibited from performing the sending operation for a predetermined period, e.g. five seconds upon reception of the speech communication request or connection request mentioned above. This arrangement makes the system configuration rather complicated and expensive.

Besides, in conjunction with the system according to the first embodiment of the invention, it is noted that once the simultaneous bidirectional transmission/reception communication mode, i.e., the duplex mode speech communication has been established in succession to completion of the connection with a telephone set, it is impossible to restore the simplex mode operation by resorting to other measures than that for ending the speech communication.

In this conjunction, in the system according to the first embodiment of the invention, the condition prerequisite for ending the speech communication is that the carrier signal or the synchronizing signal of the counterpart party has been interrupted at least for a predetermined time duration which must be of a relatively long period which is sufficient for coping with changes in the electromagnetic wave propagation behavior in the radio channel.

By way of example, in an urban district where field intensity of the radio wave undergoes significant variations, short-duration carrier loss will take place at a frequency not to be neglected. When the speech communication is ended every time such carrier loss occurs, the radio communication system can scarcely enjoy practical effectiveness.

This, in the system according to the first embodiment of the invention described hereinbefore, the condition prerequisite for enabling the speech communication ending processing is selected so that a loss or absence of the carrier signal or the synchronizing signal takes place over a considerably extended time duration, which means, however, that a remarkable time delay intervenes between the speech communication ending operation such as the on-hook operation and the actual release of the relevant telephone line, incurring wasteful line (channel) occupation.

With the second embodiment of the invention, it is contemplated to mitigate the complicatedness of the system configuration while preventing useless or wasteful occupation of the telephone line or channel.

Figure 4:
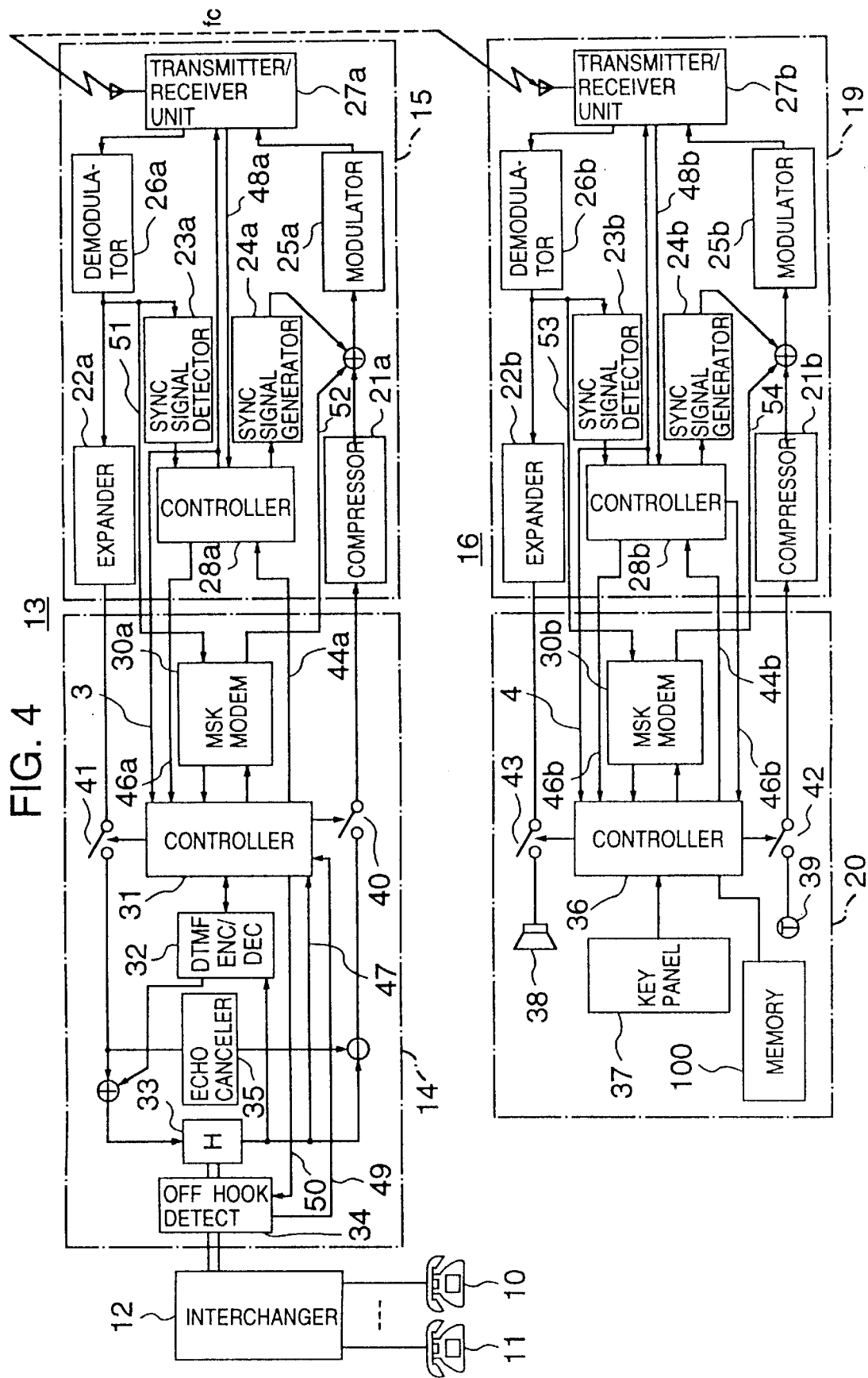
FIG. 4 is a block diagram showing a system configuration of a bidirectional concurrent speech communication system according to a second embodiment of the present invention.

In FIG. 4, a reference numeral 3 designates a base station transmission timing signal generated by the controller 28a incorporated in the base station radio transceiver 15 of the base station 13, and numeral 4 designates a mobile station transmission timing signal outputted from the controller 28b provided internally of the mobile station radio transceiver 19 of the car-onboard mobile terminal 16.

The simultaneous bidirectional transmission/reception system according to the instant embodiment of the invention is implemented in a configuration substantially identical with the system according to the first embodiment described hereinbefore except for differences with respect to the structures of the controller 31 of the base station 13, the controller 28a of the base station radio transceiver 15, the controller 28b of the mobile station radio transceiver 19 and the controller 36 of the handset 20.

Now, operation of the radio telephone communication system according to the second embodiment of the invention will be described by referring to FIGS. 5 and 6 which illustrate line connection procedures.

Figure 5:
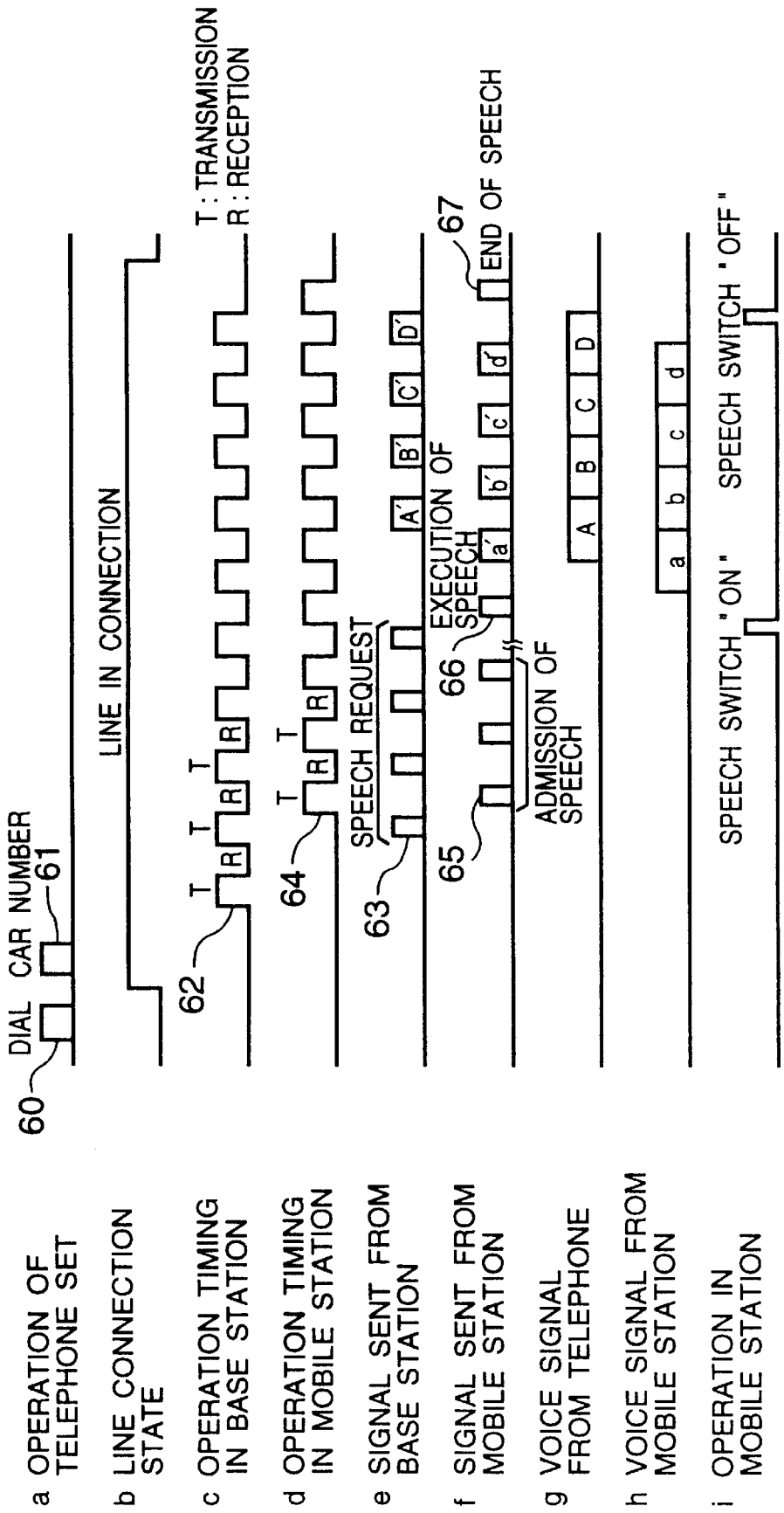
FIG. 5 is a timing chart for illustrating a speech line (channel) connection procedure involved when a mobile station is called from a telephone set in the system according to the second embodiment of the present invention.

At first, reference is made to FIG. 5 which illustrates a line connection procedure when a mobile station is called from a telephone set. The second embodiment of the invention differs from the first embodiment with respect to the transmission timing of the base station radio transceiver 15 shown at (c) in FIG. 5, the transmission timing of a station called by a telephone set of the car-onboard mobile terminal 16 (or the portable mobile terminal 17) shown at (d) and hence a transmission signal of the base station radio transceiver 15 shown at (e) and a transmission signal sent from the mobile station radio transceiver 19 of the car-onboard mobile terminal 16 (or the portable mobile terminal 17) called from the base station as shown at (f) in FIG. 5. Except for these differences, the signal waveforms shown in FIG. 5 are substantially same as those illustrated in FIG. 2.

First, referring to FIG. 5, a connection procedure will be elucidated on the assumption that the car-onboard mobile terminal 16 (or the portable mobile terminal 17) is called from a telephone set.

It is now assumed that the subscriber of the telephone set 10 or 11 inputs by dialing a telephone number 60 of the line connector 14, as illustrated at (a) in FIG. 5. In response thereto, a ring tone signal is sent out from the interchanger (exchange) 12.

In response, the line connector 14 sets to the off-hook state the switch provided internally of the on/off-hook/ring detector 34, as a result of which a line connection is established between the calling party telephone set and the line connector 14.

Subsequently, the subscriber of the telephone set of concern can now input a car identifying number 61 of a mobile station to be called in the form of a DTMF signal by inputting the car identifying number 61 by manipulating the ten keys of the telephone set.

The line connector 14 then decodes the car identifying number 61 by means of the DTMF (Dual-Tone Multifrequency) encoder/decoder 32, output of which is then supplied to the controller 31. In response, the controller 31 switches on the duplex mode switch signal 44*a*, which is inputted to the controller 28*a* of the base station radio transceiver 15 to thereby set the base station radio transceiver 15 to the duplex mode operation state. The controller 28*a* responds to the duplex mode switch signal 44*a* to thereby cause the synchronizing signal generator 24*a* to generate the synchronizing signal. In accordance with this synchronizing signal, the transmission interval and the reception interval are alternately changed over. The modulator 25*a* modulates the carrier fc with the synchronizing signal. The signal resulting from the modulation with the synchronizing signal is sent out from the transmitter/receiver unit 27*a*.

Thus, with the phrase "duplex mode operation", it is intended to mean a bidirectional communication operation performed by the base station radio transceiver 15 and the mobile station radio transceiver 19 in accordance with the synchronizing signal affixed to the signal transmitted or sent out from one of the base station radio transceiver 15 and the mobile station radio transceiver 19, as shown at (b) in FIG. 8. Thus, the transmission/reception operation is effectuated at the timing shown at (c) in FIG. 5.

Subsequently, the controller 31 detects the transmission timing on the basis of the transmission timing signal 62 (synchronizing signal) sent from the base station radio transceiver 15 in the duplex mode to thereby output a speech communication request command 63 to the MSK modem 30*a* during the relevant transmission time interval.

The speech communication request command 63 contains the base station identification number of the associated station and the car number of the mobile station to be called.

The MSK modem 30*a* converts the speech communication request command 63 to a MSK signal which is supplied intact to the modulator 25*a* of the base station radio transceiver by bypassing the speech signal compressor 21*a*.

Thus, the speech communication request command 63 is sent out without being compressed during the transmission time interval when the base station transceiver is in the simultaneous transmission/reception operation mode, as shown at (e) in FIG. 5.

On the other hand, the mobile station detects the synchronizing signal from the transmission timing signal 62 sent from the base station 13 in the duplex mode to thereby assume the duplex mode reception state. Upon reception of the speech communication request command 63, the car-onboard mobile terminal 16 (or the portable mobile terminal 17) restores the MSK signal of the speech communication request command demodulated through the demodulator 26*a* to the original data by means of the MSK modem 30*b* provided internally of the handset 20. The original data as restored is then inputted to the controller 36.

The memory 100 stores the identification number of the associated base station and the car number. The controller 36 collates the data contained in the speech communication request command 63 as received with the identification numbers stored in the storage or memory 100. When it is verified by the controller 36 that the speech communication request command 63 as received originates from the associated base station and that the car number coincides with the associated station number, the controller 36 switches on the duplex mode switch signal 44*b* for the controller 28*b* of the mobile station radio transceiver 19 to thereby set the mobile station radio transceiver 19 to the simultaneous or concurrent transmission/reception communication mode in synchronism with the base station.

In succession, the controller 36 outputs the speech communication request admit command 65 to the MSK modem 30*b* during a transmission time interval (see FIG. 5, (d)) of the transmission timing signal (synchronizing signal) 64 sent from the mobile station radio transceiver 19 in the duplex mode.

The speech communication request admit command 65 contains the car number of the associated station and the base station ID number to which the associated station belongs.

The MSK modem 30*b* in turn converts the speech communication request admit command 65 to the MSK signal which is then supplied straightforwardly to the modulator 25*b* of the mobile station transceiver by bypassing the speech signal compressor 21*b*.

In this manner, the speech communication request admit command 65 is sent out without being compressed during the transmission interval in the concurrent transmission/reception communication state of the mobile station radio transceiver 19.

At that time, the controller 36 of the handset 20 generates the speech communication request admit command 65 mentioned above and at the same time generates a predetermined incoming call indication.

On the other hand, the other mobile stations 16 are also set to the duplex mode reception state in response to reception of the transmission timing signal 62 from the base station 13. However, the controller 36 of the other mobile station is arranged so that the mobile station radio transceiver is inhibited from performing the send operation in the duplex mode and that the receiver 38 of the handset 20 is prohibited from generating the speech output, unless the command as received originates in the base station to which the associated mobile station belongs and unless the car number is identical with the ID number of the associated MS.

Such arrangement may be adopted that the speech content of the other station(s) can be monitored by making use of the output of the receiver, as occasion requires.

To this end, the base station 13 is arranged so as to send out the speech communication request command 63 repetitively during each transmission interval until the speech communication execute signal is received from the mobile station, as shown at (e) in FIG. 5.

After sending out the speech communication request admit command 65, the incoming call indication is generated in the car-onboard mobile terminal 16, as mentioned previously. When the operator of the mobile station turns on the speech switch or takes up the receiver, the controller 36 then sends out the speech communication execute command 66, as shown at (f) in FIG. 5. The speech communication execute command 66 is supplied to the modulator 25*b*, bypassing the speech signal compressor 21*b*.

When the base station receives the speech communication execute command 66 sent out from the mobile station, the controller 31 of the base station stops operation for sending the speech communication request command 63, as shown at (e) in FIG. 5.

Thereafter, speech communication can take place between the calling party telephone set and the mobile station as called.

In the mobile station, the speech ending procedure is executed in such a manner as mentioned below.

When the speech switch is turned off or the receiver is hooked on in the car-onboard mobile terminal 16, the controller 36 incorporated in the handset 20 turns off the switch 42 to prevent the speech signal from the microphone 39 from being outputted to the mobile station radio transceiver 19 and at the same time generates the speech communication end command 67, which is straightforwardly supplied to the modulator 25b of the mobile station transceiver during the transmission interval of the associated station. The modulator 25b modulates the carrier fc with the speech communication end command 67. The modulated signal is then sent out from the transmitter/receiver unit 27b.

Subsequently, the duplex mode switch signal 44a for the controller 28b of the mobile station radio transceiver 19 is switched off to allow the mobile station transceiver to resume the reception-only state.

On the other hand, in the base station 13, the controller 31 switches off the duplex mode switch signal 44a in response to reception of the speech communication end command 67 to thereby allow the base station radio transceiver 15 to resume the reception-only state.

Further, the controller 31 turns off the hook switch incorporated in the off-hook/ring detector 34, which results in disconnection of the telephone line between the interchanger 12 and the base station 13.

The procedure for ending the communication on the side of the telephone set is processed as follows.

When the subscriber sets the telephone set to the on-hook state, the controller 31 of the line connector 14 detects the ring tone signal being sent out from the interchanger 12 to thereby set the hook switch provided internally of the off-hook/ring detector 34 to the on-hook state, whereby the telephone line between the interchanger 12 and the telephone set of concern is disconnected.

Further, the controller 31 turns off the switch 40 to thereby prevent the speech inputted from the telephone set from being outputted to the base station radio transceiver 15, while allowing the MSK modem 30a to output a speech communication end command (not shown) to the modulator 25a of the base station radio transceiver 15 during the transmission time interval allocated to the base station radio transceiver 15. Subsequently, the duplex mode switch signal 44a is switched off to allow the base station radio transceiver 15 to resume the receiving operation. The speech end command of the base station radio transceiver 15 is inputted to the modulator 25a without being compressed. The modulator 25a modulates the carrier fc with the speech end command. The signal resulting from the modulation is sent out from the transmitter/receiver unit 27a.

On the other hand, when the speech end command sent out from the base station 13 is received by the car-onboard mobile terminal 16, the controller 36 switches off the duplex mode switch signal 44b to allow the mobile station radio transceiver 19 to resume the receiving operation.

Next, a procedure for calling a telephone set from the car-onboard mobile terminal 16 (or the portable mobile terminal 17) will be described by referring to FIG. 6.

Figure 6:
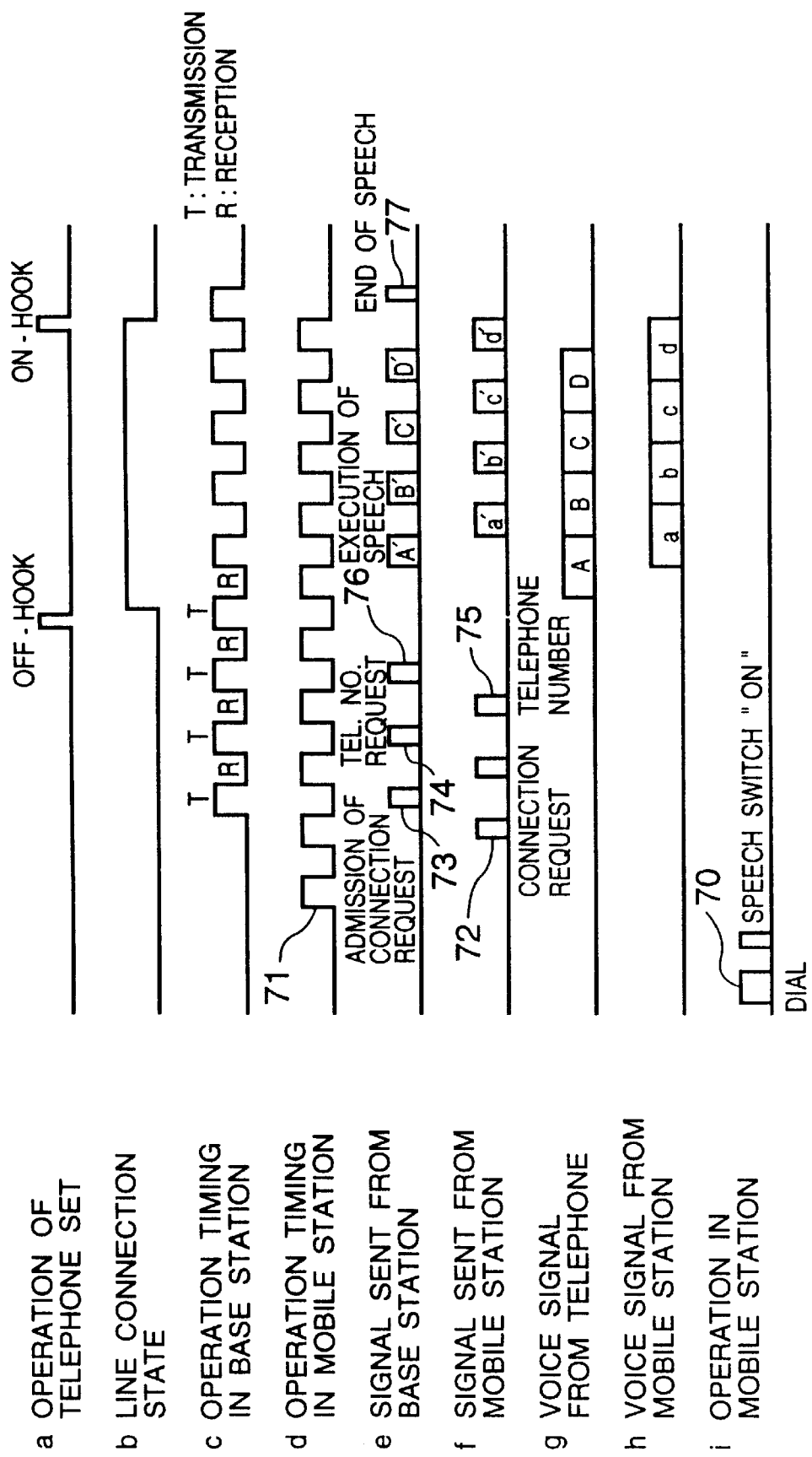
FIG. 6 is a timing chart showing a speech line (channel) connection procedure involved in calling a telephone set from a mobile station in the system according to the second embodiment of the invention.

When a telephone number 70 of the telephone set to be called is dialed in the car-onboard mobile terminal 16 (or the portable mobile terminal 17) to turn on the speech switch, as shown at (i) in FIG. 6, the controller 36 of the handset of that station switches on the duplex mode switch signal 44b, whereby the mobile station radio transceiver 19 is set to the duplex operation mode, as shown at (d) in FIG. 6.

Subsequently, the controller 36 outputs a connection request command 72 to the MSK modem 30b in synchronism with a transmission timing signal 71 (synchronizing signal) shown at (d) in FIG. 5 during the transmission interval of the mobile station radio transceiver 19 in the duplex mode.

In response, the MSK modem 30b converts the connection request command 72 to the MSK signal. The signal resulting from the conversion is outputted to the modulator 25b of the mobile station radio transceiver 19 without being compressed.

The connection request command 72 contains the car ID number of the mobile station now under consideration and the ID number of the base station to which the mobile station belongs.

In this way, the connection request command 72 is sent out, as carried by the carrier fc, from the mobile station radio transceiver 19 of the mobile station, as shown at (f) in FIG. 6.

In the base station received the connection request command 72, the controller 31 of the line connector 14 switches on the duplex mode switch signal 44a to set the base station radio transceiver 15 to the concurrent transmission/reception communication mode synchronized with the mobile station, as shown at (c) in FIG. 6, provided that the connection request command 72 contains the ID number of the base station received the connection request command 72 and that the mobile station ID number is registered.

Subsequently, the controller 31 outputs a connection request admit command 73 to the MSK modem 30a during the transmission interval assigned to the associated station, which is then followed by outputting of a telephone number request admit command 74 during the succeeding transmission interval.

The MSK modem 30 converts these commands to the MSK signal, which is then supplied to the modulator 25a of the base station radio transceiver 15.

In this way, the connection request admit command 73 and the telephone number request admit command 74 are sequentially sent out in this order from the base station, as shown at (e) in FIG. 6.

In this case, the other mobile stations are set to the reception-only state in the duplex mode in response to the synchronizing signal sent out from the calling mobile station. However, unless the commands as received are from the base station to which the other mobile station belongs and unless the car number coincides with the ID number of the other mobile station, the controller 36 inhibits transmitting operation of the mobile station radio transceiver 19 while prohibiting generation of the speech from the receiver 38 of the handset 20.

The mobile station radio transceiver 19 of the calling party mobile station sends a telephone number 75 of the telephone set to which access is requested (i.e., the telephone set being called) in response to the telephone number request admit command 74 issued from the base station 13. In this case, the telephone number 75 is not compressed either.

In the base station, when the telephone number 75 is received, the controller 31 of the line connector 14 sets to the off-hook state the hook switch provided internally of the on/off-hook/ring detector 34. Subsequently, the controller 31 dials to the interchanger 12 the telephone number 75 supplied from the DTMF encoder/decoder 32. Parenthetically, when the interchanger 12 is of a pulse type, it is possible to dial by using a pulse dialer instead of the DTMF encoder/decoder 32.

The controller 31 sends a speech communication execute command 76 to the MSK modem 30a. Thus, the speech communication execute command 76 is sent to the mobile station radio transceiver 19 without being compressed, as shown at (e) in FIG. 6.

Upon reception of the speech communication execute command 76, the mobile station radio transceiver 19 then conducts communication in accordance with the conventional scheme (i.e., the speech signal inputted by way of the microphone is temporally by about a half while the compressed speech as received is expanded or decompressed before being outputted from the receiver).

Then, the base station radio transceiver 15 enters the concurrent transmission/reception mode synchronizing with the ending operation of the mobile station radio transceiver 19. In this concurrent transmission/reception mode, the speech signal from the telephone set is temporarily compressed by about one half for transmission, while the compressed speech signal as received is expanded or decompressed to be subsequently outputted from the telephone set.

When the telephone set being called is set to the off-hook state, a subscriber's circuit loop is formed between the telephone set and the interchanger 12 to allow the communication between the mobile station radio transceiver 19 and the telephone set.

In this case, the ring-back tone as sent from the interchanger 12 continues to be generated in the mobile station until the telephone is off hook.

Next, a procedure for executing a speech end processing in the communication system according to the second embodiment will be described.

The speech end procedure performed on the side of the telephone set is as follows.

When the telephone set which is in speech communication is set to the on-hook state and when the busy tone sent from the interchanger 12 is detected by the controller 31 of the line connector, the controller 31 sets the hook switch incorporated in the off-hook/ring detector 34 to the on-hook state to thereby disconnect the telephone line extending from the interchanger 12. Thereafter, a speech communication end command 77 is sent out to the mobile station by way of the MSK modem 30a. When the sending of the speech communication end command 77 is completed, the duplex mode switch signal 44a for the base station radio transceiver 15 is switched off.

Thus, the base station radio transceiver 15 is set to the reception-only state (or monitoring state to say in another way).

On the other hand, upon reception of the speech communication end command 77 in the mobile station radio transceiver 19, the controller 36 switches off the duplex mode switch signal 44b to thereby reset the mobile station radio transceiver 19 to the reception-only state. Thus, the speech communication is ended.

In the mobile station radio transceiver 19, the speech end procedure is carried out in the following manner.

When the speech switch is turned off or alternately when the receiver is hung in the mobile station radio transceiver 19, the controller 36 turns off the switch 42 to interrupt the supply of the speech signal from the microphone 39 to the mobile station radio transceiver 19 while outputting the speech communication end command to the modulator 25a of the mobile station transceiver by way of the MSK modem 30b during the transmission interval assigned to the mobile station now under consideration.

On the other hand, in the base station 13, the controller 31 switches off the duplex mode switch signal 44a in response to reception of the speech communication end command to thereby allow the base station radio transceiver 15 to resume the reception-only state (monitoring state).

Further, the controller 31 sets the hook switch of the off-hook/ring detector 34 to the on-hook state for disconnecting the telephone line.

The interchanger 12 sends the busy tone signal to the telephone set, prompting the subscriber to hang the handset on. When the handset is hung on, the speech communication is ended.

As is apparent from the foregoing description, in the communication system according to the second embodiment of the invention, the concurrent transmission/reception operation in the duplex mode is validated at the beginning of the line connection processing.

Accordingly, the other mobile station detecting the concurrent transmission/reception may be inhibited from sending operation during the reception interval of the duplex mode.

Thus, the sending or transmission operation of the other mobile station can positively be prohibited without requiring any special measures.

Furthermore, since the speech communication end processing is started upon sending-out of the speech communication end command in the radio telephone communication system according to the second embodiment of the invention, the speech communication end processing can be executed quickly, whereby the time for which the speech communication channel is wastefully occupied can be kept to a minimum.

Moreover, because both the line connection processing and the speech communication are carried out in the duplex mode transmission/reception communication state in the communication system according to the second embodiment of the invention, differing from that of the first embodiment, additional applicable operations such as mentioned below can be realized.

(1) When a mobile station is to be called from the telephone set after the end of communication with another mobile station called before, the first mentioned mobile station can be called when the line between the telephone set and the line connector is held as it is. This operation will be described hereinafter in conjunction with a third embodiment of the invention by reference to FIG. 11.

(2) When a telephone subscriber is to be called from a mobile station upon ending communication with another telephone subscriber, the first mentioned subscriber can be called while allowing the transmission or sending operation of the mobile station to continue.

In the foregoing description of the second embodiment of the invention, it has been assumed that the switching time interval in the transmission/reception alternate switching communication system is identical with the time division switching interval in the single-frequency simultaneous transmission/reception communication system. It should however be mentioned that the invention is never limited to such arrangement. By way of example, the controller of each transceiver may be equipped with such a control facility which makes the switching interval in the transmission/reception alternate switching communication system be independent of the time division switching interval in the single-frequency simultaneous transmission/reception communication system.

In conjunction with the first and second embodiments, it should further be added that the procedures for establishing the speech communication path between the telephone set and the mobile station, as illustrated in FIGS. 2, 3, 5 and 6, can be equally adopted when access is made to a mobile station from another station (i.e., when a mobile station calls another mobile station).

As will now be understood from the foregoing according to a teachings of the present invention, matching can exactly or properly be realized between the processing required for connection with the telephone circuit and operations involved in the speech communication based on the single-frequency simultaneous transmission/reception communication scheme after the connection processing has been completed. Thus, by simply connecting a transceiver capable of operating in accordance with the single-frequency simultaneous transmission/reception communication scheme to a telephone line or circuit, it is possible to perform a bidirectional concurrent speech communication which in turn, means that utility of the communication system can be significantly improved while ensuring an extended range of services for the radio transceiver of the single-frequency simultaneous transmission/reception type.

Finally, a third embodiment of the present invention will be described.

Embodiment 3

Figure 11:
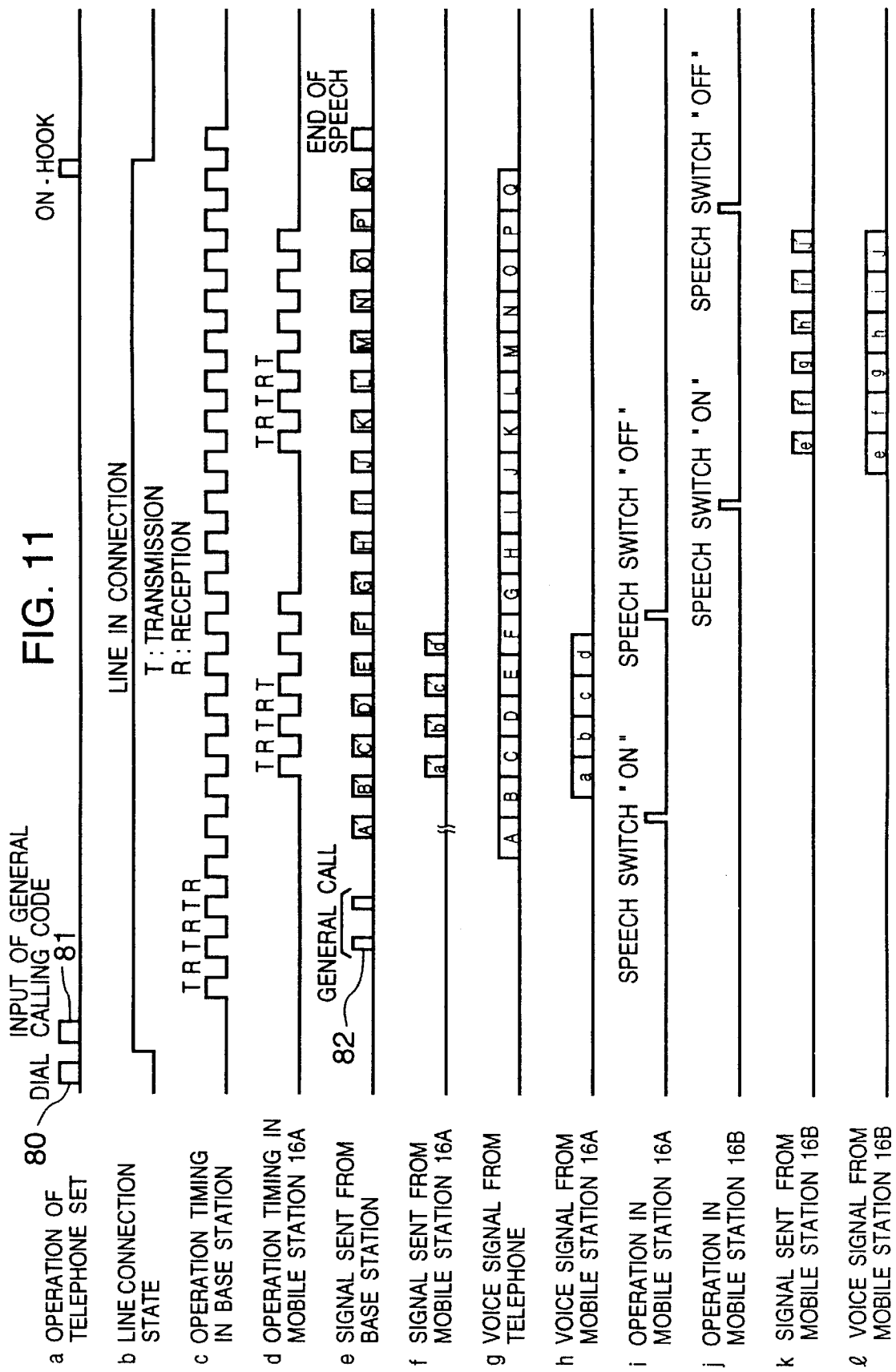
FIG. 11 is a timing chart for illustrating a speech communication procedure upon calling concurrently a plurality of radio transceivers from a telephone set according to a third embodiment of the present invention.

FIG. 11 shows a procedure for calling all the mobiles stations sequentially from a base station according to the teachings of the third embodiment of the invention. Incidentally, in the example shown in FIG. 11, it is assumed that the number of the mobile station is two, i.e., mobile stations 16A and 16B. It should however be appreciated that the invention can equally be applied to the case where three or more mobile stations are to be handled.

It is now assumed that the subscriber of the telephone set 10 or 11 inputs by dialing a telephone number 80 of the line connector 14, as illustrated at (a) in FIG. 11. In response thereto, a ring tone signal is sent out from the interchanger 12.

In response, the line connector 14 turns off the hook switch provided internally of the off-hook/ring detector 34, as a result of which a line connection is established between the calling party telephone set and the line connector 14.

Subsequently, the subscriber of the telephone set of concern can input a general calling code 81 in the form of a DTMF signal by pushing a corresponding key such as, for example, a key labeled "*".

The line connector 14 then decodes the general calling code 81 by means of the DTMF (Dual-Tone Multifrequency) encoder/decoder 32, the output of which is then supplied to the controller 31. In response, the controller 31 switches on the duplex mode switch signal 44a, which is then inputted to the controller 28a of the base station radio transceiver 15 to thereby set the base station radio transceiver 15 to the duplex mode operation state.

In this conjunction, with the phrase "duplex mode operation", it is intended to mean a bidirectional communication operation performed by the base station radio transceiver 15 and the mobile station radio transceiver 19 in accordance with the synchronizing signal affixed to the signal transmitted or sent out from one of the base station radio transceiver 15 and the mobile station radio transceiver 19, as shown at (b) in FIG. 8. Thus, the transmission/reception operation is effectuated at the timing shown at (c) in FIG. 11.

Subsequently, the controller 31 detects the transmission timing on the basis of the transmission timing signal (synchronizing signal) 3 sent from the base station radio transceiver 15 in the duplex mode to thereby output a general calling command 82 to the MSK modem 30a during the relevant transmission time interval.

The general calling command 82 contains the base station identification number of the associated station and the general calling code.

The MSK modem 30a converts the general calling command 82 to a MSK signal which is supplied intact to the modulator 25a of the base station radio transceiver by bypassing the speech signal compressor 21a.

Thus, the general calling command 82 is sent out without being compressed during the transmission time interval when the base station radio transceiver 15 is in the concurrent transmission/reception mode, as shown at (e) in FIG. 11.

On the other hand, the mobile stations 16A and 16B detect the synchronizing signal from the transmission timing signal transmitted from the base station 13 in the duplex mode to thereby assume the reception state of duplex mode. Upon reception of the general calling command 82, the MSK signal of the demodulated general calling command is restored to the original data by means of the MSK modem 30b provided internally of the handset 20. The original data as restored is then inputted to the controller 36. Upon reception of the general calling command 82, the controller 36 turns on (closes) the switch 43 to expand or decompress the speech signal received by the mobile station radio transceiver 19 from the base station 13, the expanded speech signal being outputted from the receiver 38.

At that time, the controller 36 of the handset 20 of each of the mobile stations 16A and 16B outputs the speech signal incoming from the base station 13 through the receiver 38 and generates a predetermined incoming call indication. When the subscribers or operators of the mobile stations take up the respective receivers, they can hear the speech through the telephone set.

When the operator attending one of the mobile stations, e.g. operator of the mobile station 16A, turns on (closes) the speech switch, the controller 36 switches on the duplex mode switch signal 44b for the controller 28b of the radio transceiver of the mobile station 16A to thereby set the mobile station radio transceiver 19 of the mobile station 16A to the concurrent transmission/reception state in synchronism with the mobile station radio transceiver 19 of the mobile station 16A.

Subsequently, speech communication can be carried out between the calling party telephone set and the mobile station 16A. In this case, the subscriber of the mobile station 16B can hear the speech through the telephone set.

When the operator of the mobile station 16A turns off the speech switch, the controller 36 switches off the duplex mode switch signal 44b to thereby set the mobile station radio transceiver 19 of the mobile station 16A to the reception-only state (monitoring state).

Similarly, when the operator of the mobile station 16B turns on the speech switch, the controller 36 of the mobile station 16B switches on the duplex mode switch signal 44b for the controller 28b of the radio transceiver of the mobile station 16B to thereby set the mobile station radio transceiver 19 of the mobile station 16B to the concurrent transmission/reception state, being synchronized with the base station. Thus, speech communication can be carried out between the telephone set and the mobile station 16B.

The speech communication ending procedure is executed on the side of the telephone set. By setting the telephone set to the on-hook state, the busy signal is sent out from the interchanger (exchange) 12. In response, the controller 31 of the line connector 14 sets the hook switch provided internally of the on/off-hook/ring detector 34 to the on-hook state to thereby disconnect the telephone line from the interchanger (exchange) 12.

In response, the controller 31 turns off the switch 40 to thereby prohibit the speech information from being outputted to the base station radio transceiver 15 from the telephone set. The MSK modem 30a outputs the speech communication end command to the modulator 25a of the base station radio transceiver. Subsequently, the duplex mode switch signal 44a is switched off to allow the base station radio transceiver 15 to resume the reception-only state (monitoring state).

On the other hand, upon reception of the speech communication end command issued from the base station, the mobile station which is in the concurrent transmission/reception mode resumes the reception-only state by switching off the duplex mode switch signal 44b. When the synchronizing signal from the base station is interrupted, the mobile station is set back to the reception-only state in response to the interruption of the synchronizing signal from the base station. The mobile station in the duplex receiving state resumes the simplex receiving state in response to the interruption of the synchronizing signal incoming from the base station.

Through the procedure described above, the subscriber or operator of a telephone set may call all the mobile stations from the telephone set to thereby execute the speech communication with the mobile stations sequentially on a one-by one bases.

Many modifications and variations of the present invention are possible in the light of the above techniques. It is therefore to be understood that within the scope of the appended claims, the invention may be practiced otherwise than as specifically described.

What is claimed is:

1. A communication system for performing substantially simultaneous bidirectional communications between a radio communication system and a telephone communication system by using a single frequency carrier comprising:

a base station coupled to said telephone communication system, including:
  a transmitter for transmitting speech communication request signals,
  a receiver for receiving speech communication admit signals,
  a synchronizing signal generator for generating a synchronizing signal,
  a signal divider for periodically dividing an input voice signal at predetermined intervals and for compressing the divided voice signals,
  an adder for adding said synchronizing signal to the divided and compressed voice signal and for transmitting said divided and compressed voice signal with said synchronizing signal during a transmission interval,
  another adder for receiving said divided and compressed voice signal with said synchronizing signal during a reception interval,
  an expander for expanding said divided and compressed voice signal to reproduce the original input voice signal, and
  first controller for controlling the respective operations of said transmitting means for speech communication request signals, said receiving means for speech communication admit signals, said synchronizing signal generator, said dividing and compressing means of said input voice signal, said adding means for said synchronizing signal, said transmitting means for said divided and compressed voice signal, said receiving means for said divided and compressed voice signal and said expanding means of said divided and compressed voice signal;

a terminal station, including:
  a memory for storing an ID number of said terminal station,
  a receiver for receiving said speech communication request signals from said base station,
  a transmitter for transmitting said speech communication admit signals to said base stations,
  a synchronizing signal generator for generating a synchronizing signal,
  a signal divider for periodically dividing an input voice signal at predetermined intervals and for compressing the divided voice signals,
  an adder for adding said synchronizing signal to the divided and compressed voice signal and for transmitting said divided and compressed voice signal with said synchronizing signal to said base station during a transmission interval,
  a receiver for receiving said divided and compressed voice signal with said synchronizing signal from said base station during a reception interval,
  an expander for expanding said divided and compressed voice signal to reproduce an original voice signal, and
  second controller for controlling the respective operations of said receiving means for speech communication request signals, and transmitting means for speech communication admit signals, said synchronizing signal generator, said dividing and compressing means of said input voice signal, said adding means of said synchronizing signal, said transmitting means for said divided and compressed voice signal, said receiving means for said divided and compressed voice signal and said expanding means of said divided and compressed voice signal;

an interchanger connected with said base station; and at least one telephone set connected with said interchanger by way of a telephone line;

wherein said first and second controllers enable actuation of said transmitting means for speech communication request signals and said receiving means for speech communication admit signals of said base station, said receiving means for said speech communication request signals and said transmitting means for said speech communication admit signals of said terminal station, during a connection processing period when said telephone set is connected with said terminal station through said base station, and further enable actuation of said transmitting means and said receiving means for said voice signals of said base station and said terminal station so as to change over said transmission interval and said reception interval alternately at a predetermined period when the contents of said speech communication request signals coincide with the contents of said memory.

2. A method of performing substantially simultaneous bidirectional communications between a telephone communication system and a radio communication system by using a single-frequency carrier, said radio communication system comprising a base station coupled to said telephone communication system and a terminal station having memory means for storing an ID number of said terminal station, which operates in such a manner that a transmission interval and a reception interval are alternately changed over at a predetermined period in a communication between said base station and said terminal station, said method comprising the steps of:

- transmitting speech communication request signals generated in said base station in response to said telephone communication system in said transmission interval to said terminal station;
- recognizing whether the contents of said speech communication request signals coincide with the contents of said memory means in the terminal station;
- receiving speech communication admit signals from said terminal station in said reception interval in said base station when the contents of said speech communication request signals coincide with the contents of said memory means;
- periodically dividing an input voice signal at predetermined intervals;
- compressing the divided voice signal resulting from said dividing step;
- adding a synchronizing signal to the divided and compressed voice signal;
- transmitting a first compressed voice signal with said synchronizing signal from said base station to said terminal station in said transmission interval;
- receiving a second compressed voice signal with a synchronizing signal from said terminal station in said base station in said reception interval; and
- expanding said first and second compressed voice signals in said terminal and base stations, respectively, to obtain original voice signals.

3. A method of performing bidirectional communications between a telephone communication system and a radio communication system according to claim 2, further including a step of inhibiting sending of an output from said terminal station in a predetermined period when the contents of said speech communication request signals is inconsistent with the contents of said memory means.

4. A method of performing bidirectional communications between a telephone communication system and a radio communication system according to claim 2, further including a step of transmitting repeatedly said speech communication request signals in said transmission interval until said speech communication admit signals are received in said base station from said terminal station in said reception interval.

5. A communication system for performing substantially simultaneous bidirectional communications between a radio communication system by using a single-frequency carrier and a telephone communication system, comprising:

- a base station including a first radio transceiver and a line connector disposed between said first radio transceiver and said telephone communication system;
- a terminal station including a second radio transceiver connected to said first radio transceiver by way of a radio channel of said single frequency carrier;
- an interchanger connected to said line connector; and
- at least one telephone set connected to said interchanger by way of a telephone line;
  - each of said first and second radio transceivers including a control unit, a transmitter unit including a signal compressor, a synchronizing signal generator and a modulator, and a receiver unit including a signal expander;
  - said line connector responding to a connection request signal sent from said telephone set or said terminal station for setting said radio channel and said telephone line to an interconnected state, to thereby establish a communication enabling state between said telephone set and said terminal station during a connection processing period, and further establishing a speech enabling state between said telephone set and said terminal station by changing over said connection processing period to a speech period after said communication enabling state has been established;
  - each of said first and second radio transceivers sending a signal to be transmitted after modulation thereof by bypassing said signal compressor while demodulating a signal received from another station by bypassing said signal expander, during said line connection processing period;
  - wherein during said speech period, each of said first and second radio transceivers changes over a transmission interval and a reception interval alternately with each other at a predetermined period by controlling said transmitter unit and said receiver unit so that they operate alternately, divides an input voice signal periodically at a predetermined interval, compresses the voice signals resulting from said division, and adds to said compressed voice signal a synchronizing signal generated by said synchronizing signal generator, and sends out said compressed voice signal and said synchronizing signal from said transmitter unit during said transmission interval, while further receiving a signal sent from the other station at said reception interval and regenerating a voice signal by expanding said compressed voice signal contained in the received signal at a predetermined ratio of expansion.

6. A communication system according to claim 5, wherein during said connection processing period, said line connector generates a speech request signal in accordance with speech communication addressee number information furnished from said telephone set, said first transceiver of said base station modulates said speech request signal to thereby send out the modulated speech request signal to said terminal station while bypassing said signal compressor, and said terminal station responds to said speech request signal received from said base station by said receiver unit of said second radio transceiver to thereby send back a response signal to said base station while bypassing said signal compressor.

7. A communication system according to claim 6, wherein said speech communication request signal is a minimum shift keying (MSK) signal.

8. A communication system according to claim 5, wherein during said line connection processing period, said terminal station generates a speech request signal in accordance with a speech communication addressee number information input to said control unit of said second radio transceiver and modulates said speech request signal for sending the modulated speech request signal to said base station by bypassing said signal compressor, while said base station responds to the speech request signal received from said terminal station by said receiver unit of said first radio transceiver to thereby send back a response signal to said terminal station while bypassing said signal compressor.

9. A communication system according to claim 6 or claim 8,
said transmitter unit of each of said first and second radio transceivers further including means for adding said synchronizing signal to said speech request signal;
wherein during said line connection processing period, said transmission interval and said reception interval are alternately changed over at a predetermined period by controlling said transmitter unit and said receiver unit so that said transmitter unit and said receiver unit operate alternately at said predetermined period; and
wherein said speech request signal added with said synchronizing signal is sent out from said transmitter unit while bypassing said signal compressor during said transmission interval.

10. A communication system according to claim 9,
wherein said transmitter unit of said first or second radio transceiver sends out said speech request signal a plurality of times until said connection signal is received.

11. A communication system according to claim 9,
wherein said synchronizing signal in said line connection processing period and said synchronizing signal in said speech period are of a same period.

12. A communication system according to claim 9,
wherein said synchronizing signal in said connection processing period and said synchronizing signal in said speech period have respective periods differing from each other.

13. A communication system according to claim 9,
said communication system comprising a plurality of terminal stations;
said speech request signal issued from said base station including a general call command for concurrently calling said plurality of terminal stations;
said receiver unit in each of said plurality of terminal stations received said speech request signal containing said general call command being set to a reception-ready state;
said control unit of one of said plural terminal stations generating a connection signal in response to said speech request signal;
said control unit of the terminal station generated said connection signal selecting a transmission interval and a reception interval alternately so that said transmitter unit and said receiver unit operate alternately at a predetermined periodic interval after occurrence of said connection signal; and
said signal compressor dividing an input voice signal periodically at a predetermined interval, compressing the voice signals resulting from said division, and adding to said compressed voice signal said synchronizing signal,
wherein said compressed voice signal and said synchronizing signal are sent out from said transmitter unit during said transmission interval, while the signal received during said reception interval is expanded by said signal expander.

14. A communication system according to claim 13,
said telephone set connected to said telephone line further including means for generating a speech communication end signal for ending the speech communication;
said line connector responding to said speech communication end signal for thereby disconnecting said telephone set and said first radio transceiver from each other;
said transmitter unit responding to said speech communication end signal to thereby send out a speech end command;
said control unit of said first radio transceiver responding to said speech communication end signal to thereby stop the sending operation of said transmitter unit; and
said control unit of said second radio transceiver of said terminal station responding to reception of said speech end command to thereby stop the sending operation of said transmitter unit.

15. A communication system according to claim 9,
said communication system including a plurality of said terminal stations;
said second radio transceiver of each of said terminal stations including storage means for storing identification information (e.g. car number, telephone number) assigned to the individual terminal stations, respectively;
wherein when said terminal station receives said speech request signal from said base station, said control unit changes over said line connection processing period to said speech period when said speech request signal received by said terminal station contains the identification information stored in said storage means.

16. A communication system according to claim 15,
wherein said control unit of said second radio transceiver includes transmission inhibit means for inhibiting sending operation of the transmitter unit of said second radio transceiver for a predetermined time unless the speech request signal received by said terminal station from said base station contains the identification information stored in said storage means.

17. A communication system according to claim 16,
said terminal station further including means for generating a speech communication end signal for ending the speech communication;
said transmitter unit of said second radio transceiver of said terminal station responding to said speech communication end signal to thereby send out a speech end command; and
wherein after reception of said speech end command by said base station from said terminal station, said transmitter unit sends out a speech request signal to other terminal station while maintaining the connection state between said base station and said telephone line.

18. A communication system according to claim 16,
said telephone line being connected to a plurality of telephone sets, each of said telephone sets further including means for generating a speech communication end signal for ending the speech communication;
said line connector responding to said speech communication end signal to thereby disconnect said telephone set and said first radio transceiver from each other;
said transmitter unit sending out a speech end command in response to said speech communication end signal; and
said control unit of said second radio transceiver of said terminal station responding to reception of said speech end command to thereby generate a speech request signal to another telephone set while maintaining the connection state between said base station and said terminal station, said speech request signal to said other telephone set being sent out from said transmitter unit.

19. A communication system according to claim 16,
said telephone set connected to said telephone line further including means for generating a speech communication end signal for ending the speech communication (e.g. on-hook signal);

said line connector responding to said speech communication end signal for thereby disconnecting said telephone set and said first radio transceiver from each other;

said transmitter unit sending out a speech end command in response to said speech communication end signal; and said control unit of said first radio transceiver responding to said speech communication end signal for thereby stopping the sending operation of said transmitter unit.

20. A communication system according to claim 19, wherein said control unit of said second radio transceiver of said terminal station stops the sending operation of said transmitter unit in response to reception of said speech end command.

21. A communication system according to claim 16, said terminal station further including means for generating a speech end signal (e.g. speech switch-off signal) for ending the speech communication;

wherein said transmitter unit of said second radio transceiver of said terminal station sends out a speech end command in response to said speech end signal, while said control unit stops the sending operation of said transmitter unit in response to said speech end command.

22. A communication system according to claim 21, wherein said control unit of said first radio transceiver of said base station disconnects said line connector and said telephone line from each other and stops the sending operation of said transmitter unit in response to reception of said speech end command.

* * * * *